United States Patent
Zalewski et al.

(10) Patent No.: US 11,975,316 B2
(45) Date of Patent: May 7, 2024

(54) METHODS AND REFORMING SYSTEMS FOR RE-DISPERSING PLATINUM ON REFORMING CATALYST

(71) Applicant: MARATHON PETROLEUM COMPANY LP, Findlay, OH (US)

(72) Inventors: David J. Zalewski, Proctorville, OH (US); Vidya Dharmagadda, Russel, KY (US)

(73) Assignee: MARATHON PETROLEUM COMPANY LP, Findlay, OH (US)

( * ) Notice: Subject to any disclaimer, the term of this patent is extended or adjusted under 35 U.S.C. 154(b) by 0 days.

(21) Appl. No.: 16/869,186

(22) Filed: May 7, 2020

(65) Prior Publication Data
US 2020/0353456 A1 Nov. 12, 2020

Related U.S. Application Data

(60) Provisional application No. 62/845,485, filed on May 9, 2019.

(51) Int. Cl.
*B01J 38/44* (2006.01)
*B01J 23/62* (2006.01)
(Continued)

(52) U.S. Cl.
CPC ............ *B01J 38/44* (2013.01); *B01J 23/626* (2013.01); *B01J 23/96* (2013.01); *B01J 38/06* (2013.01)

(58) Field of Classification Search
None
See application file for complete search history.

(56) References Cited

U.S. PATENT DOCUMENTS

| 981,434 A | 1/1911 | Lander |
| 1,526,301 A | 2/1925 | Stevens |

(Continued)

FOREIGN PATENT DOCUMENTS

| AT | 11772 U1 | 4/2011 |
| BR | PI0701518 | 11/2008 |

(Continued)

OTHER PUBLICATIONS

Ebner et al., Deactivation and durability of the catalyst for HotspotTM natural gas processing, OSTI, 2000, https://www.osti.gov/etdeweb/servlets/purl/20064378 (Year: 2000).*

(Continued)

*Primary Examiner* — Coris Fung
*Assistant Examiner* — Keling Zhang
(74) *Attorney, Agent, or Firm* — Womble Bond Dickinson (US) LLP (57) ABSTRACT

Methods and systems for re-dispersing platinum on catalysts used in continuous catalyst regeneration reformer systems are disclosed. Some aspects of the disclosure provide, for example, methods of evaluating the platinum re-dispersion of a reforming catalyst in a small-scale reactor for use in a continuous catalyst regeneration reformer system and methods of improving the activity and selectivity of reforming catalysts for use in a continuous catalyst regeneration reformer system by selection of appropriate reaction parameters in a small-scale reactor for use in a continuous catalyst regeneration reformer system.

20 Claims, 2 Drawing Sheets

(51) Int. Cl.
  *B01J 23/96* (2006.01)
  *B01J 38/06* (2006.01)

(56) References Cited

U.S. PATENT DOCUMENTS

| | | |
|---|---|---|
| 1,572,922 A | 2/1926 | Govers et al. |
| 1,867,143 A | 7/1932 | Fohl |
| 2,401,570 A | 6/1946 | Koehler |
| 2,498,442 A | 2/1950 | Morey |
| 2,516,097 A | 7/1950 | Woodham et al. |
| 2,686,728 A | 8/1954 | Wallace |
| 2,691,621 A | 10/1954 | Gagle |
| 2,691,773 A | 10/1954 | Lichtenberger |
| 2,731,282 A | 1/1956 | Mcmanus et al. |
| 2,740,616 A | 4/1956 | Walden |
| 2,792,908 A | 5/1957 | Glanzer |
| 2,804,165 A | 8/1957 | Blomgren |
| 2,867,913 A | 1/1959 | Faucher |
| 2,888,239 A | 5/1959 | Slemmons |
| 2,909,482 A | 10/1959 | Williams et al. |
| 2,925,144 A | 2/1960 | Kroll |
| 2,963,423 A | 12/1960 | Birchfield |
| 3,063,681 A | 11/1962 | Duguid |
| 3,070,990 A | 1/1963 | Stanley |
| 3,109,481 A | 11/1963 | Yahnke |
| 3,167,305 A | 1/1965 | Backx et al. |
| 3,188,184 A | 6/1965 | Rice et al. |
| 3,199,876 A | 8/1965 | Magos et al. |
| 3,203,460 A | 8/1965 | Kuhne |
| 3,279,441 A | 10/1966 | Lippert et al. |
| 3,307,574 A | 3/1967 | Anderson |
| 3,364,134 A | 1/1968 | Hamblin |
| 3,400,049 A | 9/1968 | Wolfe |
| 3,545,411 A | 12/1970 | Vollradt |
| 3,660,057 A | 5/1972 | Ilnyckyj |
| 3,719,027 A | 3/1973 | Salka |
| 3,720,601 A | 3/1973 | Coonradt |
| 3,771,638 A | 11/1973 | Schneider et al. |
| 3,775,294 A | 11/1973 | Peterson |
| 3,795,607 A | 3/1974 | Adams |
| 3,838,036 A | 9/1974 | Stine et al. |
| 3,839,484 A | 10/1974 | Zimmerman, Jr. |
| 3,840,209 A | 10/1974 | James |
| 3,841,144 A | 10/1974 | Baldwin |
| 3,854,843 A | 12/1974 | Penny |
| 3,874,399 A | 4/1975 | Ishihara |
| 3,901,951 A | 8/1975 | Nishizaki |
| 3,906,780 A | 9/1975 | Baldwin |
| 3,912,307 A | 10/1975 | Totman |
| 3,928,172 A | 12/1975 | Davis et al. |
| 3,937,660 A * | 2/1976 | Yates ............... B01J 23/96 208/140 |
| 4,006,075 A | 2/1977 | Luckenbach |
| 4,017,214 A | 4/1977 | Smith |
| 4,066,425 A | 1/1978 | Nett |
| 4,085,078 A | 4/1978 | McDonald |
| 4,144,759 A | 3/1979 | Slowik |
| 4,149,756 A | 4/1979 | Tackett |
| 4,151,003 A | 4/1979 | Smith et al. |
| 4,167,492 A | 9/1979 | Varady |
| 4,176,052 A | 11/1979 | Bruce et al. |
| 4,217,116 A | 8/1980 | Seever |
| 4,260,068 A | 4/1981 | McCarthy et al. |
| 4,299,687 A | 11/1981 | Myers et al. |
| 4,302,324 A | 11/1981 | Chen et al. |
| 4,308,968 A | 1/1982 | Thiltgen et al. |
| 4,328,947 A | 5/1982 | Reimpell et al. |
| 4,332,671 A | 6/1982 | Boyer |
| 4,340,204 A | 7/1982 | Heard |
| 4,353,812 A | 10/1982 | Lomas et al. |
| 4,357,603 A | 11/1982 | Roach et al. |
| 4,392,870 A | 7/1983 | Chieffo et al. |
| 4,404,095 A | 9/1983 | Haddad et al. |
| 4,422,925 A | 12/1983 | Williams et al. |
| 4,434,044 A | 2/1984 | Busch et al. |
| 4,439,533 A | 3/1984 | Lomas et al. |
| 4,468,975 A | 9/1984 | Sayles et al. |
| 4,482,451 A | 11/1984 | Kemp |
| 4,495,063 A | 1/1985 | Walters et al. |
| 4,539,012 A | 9/1985 | Ohzeki et al. |
| 4,554,313 A | 11/1985 | Hagenbach et al. |
| 4,554,799 A | 11/1985 | Pallanch |
| 4,570,942 A | 2/1986 | Diehl et al. |
| 4,601,303 A | 7/1986 | Jensen |
| 4,615,792 A | 10/1986 | Greenwood |
| 4,621,062 A | 11/1986 | Stewart et al. |
| 4,622,210 A | 11/1986 | Hirschberg et al. |
| 4,624,771 A | 11/1986 | Lane et al. |
| 4,647,313 A | 3/1987 | Clementoni |
| 4,654,748 A | 3/1987 | Rees |
| 4,661,241 A | 4/1987 | Dabkowski et al. |
| 4,673,490 A | 6/1987 | Subramanian et al. |
| 4,674,337 A | 6/1987 | Jonas |
| 4,684,759 A | 8/1987 | Lam |
| 4,686,027 A | 8/1987 | Bonilla et al. |
| 4,728,348 A | 3/1988 | Nelson et al. |
| 4,733,888 A | 3/1988 | Toelke |
| 4,741,819 A | 5/1988 | Robinson et al. |
| 4,764,347 A | 8/1988 | Milligan |
| 4,765,631 A | 8/1988 | Kohnen et al. |
| 4,771,176 A | 9/1988 | Scheifer et al. |
| 4,816,137 A | 3/1989 | Swint et al. |
| 4,820,404 A | 4/1989 | Owen |
| 4,824,016 A | 4/1989 | Cody et al. |
| 4,844,133 A | 7/1989 | von Meyerinck et al. |
| 4,844,927 A | 7/1989 | Morris et al. |
| 4,849,182 A | 7/1989 | Luetzelschwab |
| 4,854,855 A | 8/1989 | Rajewski |
| 4,875,994 A | 10/1989 | Haddad et al. |
| 4,877,513 A | 10/1989 | Haire et al. |
| 4,798,463 A | 11/1989 | Koshi |
| 4,901,751 A | 2/1990 | Story et al. |
| 4,914,249 A * | 4/1990 | Benedict ............... C07C 5/3337 585/629 |
| 4,916,938 A | 4/1990 | Aikin et al. |
| 4,917,790 A | 4/1990 | Owen |
| 4,923,834 A | 5/1990 | Lomas |
| 4,940,900 A | 7/1990 | Lambert |
| 4,957,511 A | 9/1990 | Ljusberg-Wahren |
| 4,960,503 A | 10/1990 | Haun et al. |
| 4,963,745 A | 10/1990 | Maggard |
| 4,972,867 A | 11/1990 | Ruesch |
| 5,000,841 A | 3/1991 | Owen |
| 5,002,459 A | 3/1991 | Swearingen et al. |
| 5,008,653 A | 4/1991 | Kidd et al. |
| 5,009,768 A | 4/1991 | Galiasso et al. |
| 5,013,537 A | 5/1991 | Patarin et al. |
| 5,022,266 A | 6/1991 | Cody et al. |
| 5,032,154 A | 7/1991 | Wright |
| 5,034,115 A | 7/1991 | Avidan |
| 5,045,177 A | 9/1991 | Cooper et al. |
| 5,050,603 A | 9/1991 | Stokes et al. |
| 5,053,371 A | 10/1991 | Williamson |
| 5,056,758 A | 10/1991 | Bramblet |
| 5,059,305 A | 10/1991 | Sapre |
| 5,061,467 A | 10/1991 | Johnson et al. |
| 5,066,049 A | 11/1991 | Staples |
| 5,076,910 A | 12/1991 | Rush |
| 5,082,985 A | 1/1992 | Crouzet et al. |
| 5,096,566 A | 3/1992 | Dawson et al. |
| 5,097,677 A | 3/1992 | Holtzapple |
| 5,111,882 A | 5/1992 | Tang et al. |
| 5,112,357 A | 5/1992 | Bjerklund |
| 5,114,562 A | 5/1992 | Haun et al. |
| 5,115,686 A | 5/1992 | Walker et al. |
| 5,121,337 A | 6/1992 | Brown |
| 5,128,109 A | 7/1992 | Owen |
| 5,128,292 A | 7/1992 | Lomas |
| 5,129,624 A | 7/1992 | Icenhower et al. |
| 5,138,891 A | 8/1992 | Johnson |
| 5,139,649 A | 8/1992 | Owen et al. |
| 5,145,785 A | 9/1992 | Maggard et al. |
| 5,149,261 A | 9/1992 | Suwa et al. |
| 5,154,558 A | 10/1992 | McCallion |

(56) References Cited

U.S. PATENT DOCUMENTS

| | | |
|---|---|---|
| 5,160,426 A | 11/1992 | Avidan |
| 5,170,911 A | 12/1992 | Della Riva |
| 5,174,250 A | 12/1992 | Lane |
| 5,174,345 A | 12/1992 | Kesterman et al. |
| 5,178,363 A | 1/1993 | Icenhower et al. |
| 5,196,110 A | 3/1993 | Swart et al. |
| 5,201,850 A | 4/1993 | Lenhardt et al. |
| 5,203,370 A | 4/1993 | Block et al. |
| 5,211,838 A | 5/1993 | Staubs et al. |
| 5,212,129 A | 5/1993 | Lomas |
| 5,221,463 A | 6/1993 | Kamienski et al. |
| 5,223,714 A | 6/1993 | Maggard |
| 5,225,679 A | 7/1993 | Clark et al. |
| 5,230,498 A | 7/1993 | Wood et al. |
| 5,235,999 A | 8/1993 | Lindquist et al. |
| 5,236,765 A | 8/1993 | Cordia et al. |
| 5,243,546 A | 9/1993 | Maggard |
| 5,246,860 A | 9/1993 | Hutchins et al. |
| 5,246,868 A | 9/1993 | Busch et al. |
| 5,248,408 A | 9/1993 | Owen |
| 5,250,807 A | 10/1993 | Sontvedt |
| 5,257,530 A | 11/1993 | Beattie et al. |
| 5,258,115 A | 11/1993 | Heck et al. |
| 5,258,117 A | 11/1993 | Kolstad et al. |
| 5,262,645 A | 11/1993 | Lambert et al. |
| 5,263,682 A | 11/1993 | Covert et al. |
| 5,301,560 A | 4/1994 | Anderson et al. |
| 5,302,294 A | 4/1994 | Schubert |
| 5,316,448 A | 5/1994 | Ziegler et al. |
| 5,320,671 A | 6/1994 | Schilling |
| 5,326,074 A | 7/1994 | Spock et al. |
| 5,328,505 A | 7/1994 | Schilling |
| 5,328,591 A | 7/1994 | Raterman |
| 5,332,492 A | 7/1994 | Maurer et al. |
| 5,338,439 A | 8/1994 | Owen et al. |
| 5,348,645 A | 9/1994 | Maggard et al. |
| 5,349,188 A | 9/1994 | Maggard |
| 5,349,189 A | 9/1994 | Maggard |
| 5,354,451 A | 10/1994 | Goldstein et al. |
| 5,354,453 A | 10/1994 | Bhatia |
| 5,361,643 A | 11/1994 | Boyd et al. |
| 5,362,965 A | 11/1994 | Maggard |
| 5,370,146 A | 12/1994 | King et al. |
| 5,370,790 A | 12/1994 | Maggard et al. |
| 5,372,270 A | 12/1994 | Rosenkrantz |
| 5,372,352 A | 12/1994 | Smith et al. |
| 5,381,002 A | 1/1995 | Morrow et al. |
| 5,388,805 A | 2/1995 | Bathrick et al. |
| 5,389,232 A | 2/1995 | Adewuyi et al. |
| 5,404,015 A | 4/1995 | Chimenti et al. |
| 5,415,025 A | 5/1995 | Bartman et al. |
| 5,416,323 A | 5/1995 | Hoots et al. |
| 5,417,843 A | 5/1995 | Swart et al. |
| 5,417,846 A | 5/1995 | Renard |
| 5,423,446 A | 6/1995 | Johnson |
| 5,431,067 A | 7/1995 | Anderson et al. |
| 5,433,120 A | 7/1995 | Boyd et al. |
| 5,435,436 A | 7/1995 | Manley et al. |
| 5,443,716 A | 8/1995 | Anderson et al. |
| 5,446,681 A | 8/1995 | Gethner et al. |
| 5,452,232 A | 9/1995 | Espinosa et al. |
| RE35,046 E | 10/1995 | Hettinger et al. |
| 5,459,677 A | 10/1995 | Kowalski et al. |
| 5,472,875 A | 12/1995 | Monticello |
| 5,474,607 A | 12/1995 | Holleran |
| 5,475,612 A | 12/1995 | Espinosa et al. |
| 5,476,117 A | 12/1995 | Pakula |
| 5,490,085 A | 2/1996 | Lambert et al. |
| 5,492,617 A | 2/1996 | Trimble et al. |
| 5,494,079 A | 2/1996 | Tiedemann |
| 5,507,326 A | 4/1996 | Cadman et al. |
| 5,510,265 A | 4/1996 | Monticello |
| 5,516,969 A | 5/1996 | Krasznai et al. |
| 5,532,487 A | 7/1996 | Brearley et al. |
| 5,540,893 A | 7/1996 | English |
| 5,549,814 A | 8/1996 | Zinke |
| 5,556,222 A | 9/1996 | Chen |
| 5,559,295 A | 9/1996 | Sheryll |
| 5,560,509 A | 10/1996 | Laverman et al. |
| 5,569,808 A | 10/1996 | Cansell et al. |
| 5,573,032 A | 11/1996 | Lenz et al. |
| 5,584,985 A | 12/1996 | Lomas |
| 5,596,196 A | 1/1997 | Cooper et al. |
| 5,600,134 A | 2/1997 | Ashe et al. |
| 5,647,961 A | 7/1997 | Lofland |
| 5,652,145 A | 7/1997 | Cody et al. |
| 5,675,071 A | 10/1997 | Cody et al. |
| 5,684,580 A | 11/1997 | Cooper et al. |
| 5,699,269 A | 12/1997 | Ashe et al. |
| 5,699,270 A | 12/1997 | Ashe et al. |
| 5,712,481 A | 1/1998 | Welch et al. |
| 5,712,797 A | 1/1998 | Descales et al. |
| 5,713,401 A | 2/1998 | Weeks |
| 5,716,055 A | 2/1998 | Wilkinson et al. |
| 5,717,209 A | 2/1998 | Bigman et al. |
| 5,740,073 A | 4/1998 | Bages et al. |
| 5,744,024 A | 4/1998 | Sullivan, III et al. |
| 5,744,702 A | 4/1998 | Roussis et al. |
| 5,746,906 A | 5/1998 | McHenry et al. |
| 5,758,514 A | 6/1998 | Genung et al. |
| 5,763,883 A | 6/1998 | Descales et al. |
| 5,800,697 A | 9/1998 | Lengemann |
| 5,817,517 A | 10/1998 | Perry et al. |
| 5,822,058 A | 10/1998 | Adler-Golden et al. |
| 5,834,539 A | 11/1998 | Krivohlavek |
| 5,837,130 A | 11/1998 | Crossland |
| 5,853,455 A | 12/1998 | Gibson |
| 5,856,869 A | 1/1999 | Cooper et al. |
| 5,858,207 A | 1/1999 | Lomas |
| 5,858,210 A | 1/1999 | Richardson |
| 5,858,212 A | 1/1999 | Darcy |
| 5,861,228 A | 1/1999 | Descales et al. |
| 5,862,060 A | 1/1999 | Murray, Jr. |
| 5,865,441 A | 2/1999 | Orlowski |
| 5,883,363 A | 3/1999 | Motoyoshi et al. |
| 5,885,439 A | 3/1999 | Glover |
| 5,892,228 A | 4/1999 | Cooper et al. |
| 5,895,506 A | 4/1999 | Cook et al. |
| 5,916,433 A | 6/1999 | Tejada et al. |
| 5,919,354 A | 7/1999 | Bartek |
| 5,935,415 A | 8/1999 | Haizmann et al. |
| 5,940,176 A | 8/1999 | Knapp |
| 5,972,171 A | 10/1999 | Ross et al. |
| 5,979,491 A | 11/1999 | Gonsior |
| 5,997,723 A | 12/1999 | Wiehe et al. |
| 6,015,440 A | 1/2000 | Noureddini |
| 6,025,305 A | 2/2000 | Aldrich et al. |
| 6,026,841 A | 2/2000 | Kozik |
| 6,047,602 A | 4/2000 | Lynnworth |
| 6,056,005 A | 5/2000 | Piotrowski et al. |
| 6,062,274 A | 5/2000 | Pettesch |
| 6,063,263 A | 5/2000 | Palmas |
| 6,063,265 A | 5/2000 | Chiyoda et al. |
| 6,070,128 A | 5/2000 | Descales et al. |
| 6,072,576 A | 6/2000 | McDonald et al. |
| 6,076,864 A | 6/2000 | Levivier et al. |
| 6,087,662 A | 7/2000 | Wilt et al. |
| 6,093,867 A | 7/2000 | Ladwig et al. |
| 6,099,607 A | 8/2000 | Haslebacher |
| 6,099,616 A | 8/2000 | Jenne et al. |
| 6,102,655 A | 8/2000 | Kreitmeier |
| 6,105,441 A | 8/2000 | Conner et al. |
| 6,107,631 A | 8/2000 | He |
| 6,117,812 A | 9/2000 | Gao et al. |
| 6,130,095 A | 10/2000 | Shearer |
| 6,140,647 A | 10/2000 | Welch et al. |
| 6,153,091 A | 11/2000 | Sechrist et al. |
| 6,155,294 A | 12/2000 | Cornford et al. |
| 6,162,644 A | 12/2000 | Choi et al. |
| 6,165,350 A | 12/2000 | Lokhandwala et al. |
| 6,169,218 B1 | 1/2001 | Hearn |
| 6,171,052 B1 | 1/2001 | Aschenbruck et al. |
| 6,174,501 B1 | 1/2001 | Noureddini |
| 6,190,535 B1 | 2/2001 | Kalnes et al. |

(56) References Cited

U.S. PATENT DOCUMENTS

| | | |
|---|---|---|
| 6,203,585 B1 | 3/2001 | Majerczak |
| 6,235,104 B1 | 5/2001 | Chattopadhyay et al. |
| 6,258,987 B1 | 7/2001 | Schmidt et al. |
| 6,271,518 B1 | 8/2001 | Boehm et al. |
| 6,274,785 B1 | 8/2001 | Gore |
| 6,284,128 B1 | 9/2001 | Glover et al. |
| 6,296,812 B1 | 10/2001 | Gauthier et al. |
| 6,312,586 B1 | 11/2001 | Kalnes et al. |
| 6,315,815 B1 | 11/2001 | Spadaccini |
| 6,324,895 B1 | 12/2001 | Chitnis et al. |
| 6,328,348 B1 | 12/2001 | Cornford et al. |
| 6,331,436 B1 | 12/2001 | Richardson et al. |
| 6,348,074 B2 | 2/2002 | Wenzel |
| 6,350,371 B1 | 2/2002 | Lokhandwala et al. |
| 6,368,495 B1 | 4/2002 | Kocal et al. |
| 6,382,633 B1 | 5/2002 | Hashiguchi et al. |
| 6,390,673 B1 | 5/2002 | Camburn |
| 6,395,228 B1 | 5/2002 | Maggard et al. |
| 6,398,518 B1 | 6/2002 | Ingistov |
| 6,399,800 B1 | 6/2002 | Haas et al. |
| 6,420,181 B1 | 7/2002 | Novak |
| 6,422,035 B1 | 7/2002 | Phillippe |
| 6,435,279 B1 | 8/2002 | Howe et al. |
| 6,446,446 B1 | 9/2002 | Cowans |
| 6,446,729 B1 | 9/2002 | Bixenman et al. |
| 6,451,197 B1 | 9/2002 | Kalnes |
| 6,454,935 B1 | 9/2002 | Lesieur et al. |
| 6,467,303 B2 | 10/2002 | Ross |
| 6,482,762 B1 | 11/2002 | Ruffin et al. |
| 6,503,460 B1 | 1/2003 | Miller et al. |
| 6,528,047 B2 | 3/2003 | Arif et al. |
| 6,540,797 B1 | 4/2003 | Scott et al. |
| 6,558,531 B2 | 5/2003 | Steffens et al. |
| 6,589,323 B1 | 7/2003 | Korin |
| 6,609,888 B1 | 8/2003 | Ingistov |
| 6,622,490 B2 | 9/2003 | Ingistov |
| 6,644,935 B2 | 11/2003 | Ingistov |
| 6,660,895 B1 | 12/2003 | Brunet et al. |
| 6,672,858 B1 | 1/2004 | Benson et al. |
| 6,733,232 B2 | 5/2004 | Ingistov et al. |
| 6,733,237 B2 | 5/2004 | Ingistov |
| 6,736,961 B2 | 5/2004 | Plummer et al. |
| 6,740,226 B2 | 5/2004 | Mehra et al. |
| 6,772,581 B2 | 8/2004 | Ojiro et al. |
| 6,772,741 B1 | 8/2004 | Pittel et al. |
| 6,814,941 B1 | 11/2004 | Naunheimer et al. |
| 6,824,673 B1 | 11/2004 | Ellis et al. |
| 6,827,841 B2 | 12/2004 | Kiser et al. |
| 6,835,223 B2 | 12/2004 | Walker et al. |
| 6,841,133 B2 | 1/2005 | Niewiedzial et al. |
| 6,842,702 B2 | 1/2005 | Haaland et al. |
| 6,854,346 B2 | 2/2005 | Nimberger |
| 6,858,128 B1 | 2/2005 | Hoehn et al. |
| 6,866,771 B2 | 3/2005 | Lomas et al. |
| 6,869,521 B2 | 3/2005 | Lomas |
| 6,897,071 B2 | 5/2005 | Sonbul |
| 6,962,484 B2 | 11/2005 | Brandl et al. |
| 7,013,718 B2 | 3/2006 | Ingistov et al. |
| 7,035,767 B2 | 4/2006 | Archer et al. |
| 7,048,254 B2 | 5/2006 | Laurent et al. |
| 7,074,321 B1 | 7/2006 | Kalnes |
| 7,078,005 B2 | 7/2006 | Smith et al. |
| 7,087,153 B1 | 8/2006 | Kalnes |
| 7,156,123 B2 | 1/2007 | Welker et al. |
| 7,172,686 B1 | 2/2007 | Ji et al. |
| 7,174,715 B2 | 2/2007 | Armitage et al. |
| 7,194,369 B2 | 3/2007 | Lundstedt et al. |
| 7,213,413 B2 | 5/2007 | Battiste et al. |
| 7,225,840 B1 | 6/2007 | Craig et al. |
| 7,228,250 B2 | 6/2007 | Naiman et al. |
| 7,244,350 B2 | 7/2007 | Kar et al. |
| 7,252,755 B2 | 8/2007 | Kiser et al. |
| 7,255,531 B2 | 8/2007 | Ingistov |
| 7,260,499 B2 | 8/2007 | Watzke et al. |
| 7,291,257 B2 | 11/2007 | Ackerson et al. |
| 7,332,132 B2 | 2/2008 | Hedrick et al. |
| 7,404,411 B2 | 7/2008 | Welch et al. |
| 7,419,583 B2 | 9/2008 | Nieskens et al. |
| 7,445,936 B2 | 11/2008 | O'Connor et al. |
| 7,459,081 B2 | 12/2008 | Koenig |
| 7,485,801 B1 | 2/2009 | Pulter et al. |
| 7,487,955 B2 | 2/2009 | Buercklin |
| 7,501,285 B1 | 3/2009 | Triche et al. |
| 7,551,420 B2 | 6/2009 | Cerqueira et al. |
| 7,571,765 B2 | 8/2009 | Themig |
| 7,637,970 B1 | 12/2009 | Fox et al. |
| 7,669,653 B2 | 3/2010 | Craster et al. |
| 7,682,501 B2 | 3/2010 | Soni et al. |
| 7,686,280 B2 | 3/2010 | Lowery |
| 7,857,964 B2 | 12/2010 | Mashiko et al. |
| 7,866,346 B1 | 1/2011 | Walters |
| 7,895,011 B2 | 2/2011 | Youssefi et al. |
| 7,914,601 B2 | 3/2011 | Farr et al. |
| 7,931,803 B2 | 4/2011 | Buchanan |
| 7,932,424 B2 | 4/2011 | Fujimoto et al. |
| 7,939,335 B1 | 5/2011 | Triche et al. |
| 7,981,361 B2 | 7/2011 | Bacik |
| 7,988,753 B1 | 8/2011 | Fox et al. |
| 7,993,514 B2 | 8/2011 | Schlueter |
| 8,007,662 B2 | 8/2011 | Lomas et al. |
| 8,017,910 B2 | 9/2011 | Sharpe |
| 8,029,662 B2 | 10/2011 | Varma et al. |
| 8,037,938 B2 | 10/2011 | Jardim De Azevedo et al. |
| 8,038,774 B2 | 10/2011 | Peng |
| 8,064,052 B2 | 11/2011 | Feitisch et al. |
| 8,066,867 B2 | 11/2011 | Dziabala |
| 8,080,426 B1 | 12/2011 | Moore et al. |
| 8,127,845 B2 | 3/2012 | Assal |
| 8,193,401 B2 | 6/2012 | McGehee et al. |
| 8,236,566 B2 | 8/2012 | Carpenter et al. |
| 8,286,673 B1 | 10/2012 | Recker et al. |
| 8,354,065 B1 | 1/2013 | Sexton |
| 8,360,118 B2 | 1/2013 | Fleischer et al. |
| 8,370,082 B2 | 2/2013 | De Peinder et al. |
| 8,388,830 B2 | 3/2013 | Sohn et al. |
| 8,389,285 B2 | 3/2013 | Carpenter et al. |
| 8,397,803 B2 | 3/2013 | Crabb et al. |
| 8,397,820 B2 | 3/2013 | Fehr et al. |
| 8,404,103 B2 | 3/2013 | Dziabala |
| 8,434,800 B1 | 5/2013 | LeBlanc |
| 8,481,942 B2 | 7/2013 | Mertens |
| 8,506,656 B1 | 8/2013 | Turocy |
| 8,518,131 B2 | 8/2013 | Mattingly et al. |
| 8,524,180 B2 | 9/2013 | Canari et al. |
| 8,569,068 B2 | 10/2013 | Carpenter et al. |
| 8,579,139 B1 | 11/2013 | Sablak |
| 8,591,814 B2 | 11/2013 | Hodges |
| 8,609,048 B1 | 12/2013 | Beadle |
| 8,647,415 B1 | 2/2014 | De Haan et al. |
| 8,670,945 B2 | 3/2014 | van Schie |
| 8,685,232 B2 | 4/2014 | Mandal et al. |
| 8,735,820 B2 | 5/2014 | Mertens |
| 8,753,502 B1 | 6/2014 | Sexton et al. |
| 8,764,970 B1 | 7/2014 | Moore et al. |
| 8,778,823 B1 | 7/2014 | Oyekan et al. |
| 8,781,757 B2 | 7/2014 | Farquharson et al. |
| 8,829,258 B2 | 9/2014 | Gong et al. |
| 8,916,041 B2 | 12/2014 | Van Den Berg et al. |
| 8,932,458 B1 | 1/2015 | Gianzon et al. |
| 8,986,402 B2 | 3/2015 | Kelly |
| 8,987,537 B1 | 3/2015 | Droubi et al. |
| 8,999,011 B2 | 4/2015 | Stern et al. |
| 8,999,012 B2 | 4/2015 | Kelly et al. |
| 9,011,674 B2 | 4/2015 | Milam et al. |
| 9,057,035 B1 | 6/2015 | Kraus et al. |
| 9,097,423 B2 | 8/2015 | Kraus et al. |
| 9,109,176 B2 | 8/2015 | Stern et al. |
| 9,109,177 B2 | 8/2015 | Freel et al. |
| 9,138,738 B1 | 9/2015 | Glover et al. |
| 9,216,376 B2 | 12/2015 | Liu et al. |
| 9,272,241 B2 | 3/2016 | Königsson |
| 9,273,867 B2 | 3/2016 | Buzinski et al. |
| 9,279,748 B1 | 3/2016 | Hughes et al. |
| 9,289,715 B2 | 3/2016 | Høy-Petersen et al. |

(56) References Cited

U.S. PATENT DOCUMENTS

| | | |
|---|---|---|
| 9,315,403 B1 | 4/2016 | Laur et al. |
| 9,371,493 B1 | 6/2016 | Oyekan |
| 9,371,494 B2 | 6/2016 | Oyekan et al. |
| 9,377,340 B2 | 6/2016 | Hägg |
| 9,393,520 B2 | 7/2016 | Gomez |
| 9,410,102 B2 | 8/2016 | Eaton et al. |
| 9,428,695 B2 | 8/2016 | Narayanaswamy et al. |
| 9,458,396 B2 | 10/2016 | Weiss et al. |
| 9,487,718 B2 | 11/2016 | Kraus et al. |
| 9,499,758 B2 | 11/2016 | Droubi et al. |
| 9,500,300 B2 | 11/2016 | Daigle |
| 9,506,649 B2 | 11/2016 | Rennie et al. |
| 9,580,662 B1 | 2/2017 | Moore |
| 9,624,448 B2 | 4/2017 | Joo et al. |
| 9,650,580 B2 | 5/2017 | Merdrignac et al. |
| 9,657,241 B2 | 5/2017 | Craig et al. |
| 9,662,597 B1 | 5/2017 | Formoso |
| 9,663,729 B2 | 5/2017 | Baird et al. |
| 9,665,693 B2 | 5/2017 | Saeger et al. |
| 9,709,545 B2 | 7/2017 | Mertens |
| 9,757,686 B2 | 9/2017 | Peng |
| 9,789,290 B2 | 10/2017 | Forsell |
| 9,803,152 B2 | 10/2017 | Kar et al. |
| 9,834,731 B2 | 12/2017 | Weiss et al. |
| 9,840,674 B2 | 12/2017 | Weiss et al. |
| 9,873,080 B2 | 1/2018 | Richardson |
| 9,878,300 B2 | 1/2018 | Norling |
| 9,890,907 B1 | 2/2018 | Highfield et al. |
| 9,891,198 B2 | 2/2018 | Sutan |
| 9,895,649 B2 | 2/2018 | Brown et al. |
| 9,896,630 B2 | 2/2018 | Weiss et al. |
| 9,914,094 B2 | 3/2018 | Jenkins et al. |
| 9,920,270 B2 | 3/2018 | Robinson et al. |
| 9,925,486 B1 | 3/2018 | Botti |
| 9,982,788 B1 | 5/2018 | Maron |
| 10,047,299 B2 | 8/2018 | Rubin-Pitel et al. |
| 10,087,397 B2 | 10/2018 | Phillips et al. |
| 10,099,175 B2 | 10/2018 | Takashashi et al. |
| 10,150,078 B2 | 12/2018 | Komatsu et al. |
| 10,228,708 B2 | 3/2019 | Lambert et al. |
| 10,239,034 B1 | 3/2019 | Sexton |
| 10,253,269 B2 | 4/2019 | Cantley et al. |
| 10,266,779 B2 | 4/2019 | Weiss et al. |
| 10,295,521 B2 | 5/2019 | Mertens |
| 10,308,884 B2 | 6/2019 | Klussman |
| 10,316,263 B2 | 6/2019 | Rubin-Pitel et al. |
| 10,384,157 B2 | 8/2019 | Balcik |
| 10,435,339 B2 | 10/2019 | Larsen et al. |
| 10,435,636 B2 | 10/2019 | Johnson et al. |
| 10,443,000 B2 | 10/2019 | Lomas |
| 10,443,006 B1 | 10/2019 | Fruchey et al. |
| 10,457,881 B2 | 10/2019 | Droubi et al. |
| 10,479,943 B1 | 11/2019 | Liu et al. |
| 10,494,579 B2 | 12/2019 | Wrigley et al. |
| 10,495,570 B2 | 12/2019 | Owen et al. |
| 10,501,699 B2 | 12/2019 | Robinson et al. |
| 10,526,547 B2 | 1/2020 | Larsen et al. |
| 10,533,141 B2 | 1/2020 | Moore et al. |
| 10,563,130 B2 | 2/2020 | Narayanaswamy et al. |
| 10,563,132 B2 | 2/2020 | Moore et al. |
| 10,563,133 B2 | 2/2020 | Moore et al. |
| 10,570,078 B2 | 2/2020 | Larsen et al. |
| 10,577,551 B2 | 3/2020 | Kraus et al. |
| 10,584,287 B2 | 3/2020 | Klussman et al. |
| 10,604,709 B2 | 3/2020 | Moore et al. |
| 10,640,719 B2 | 5/2020 | Freel et al. |
| 10,655,074 B2 | 5/2020 | Moore et al. |
| 10,696,906 B2 | 6/2020 | Cantley et al. |
| 10,808,184 B1 | 10/2020 | Moore |
| 10,836,966 B2 | 11/2020 | Moore et al. |
| 10,876,053 B2 | 12/2020 | Klussman et al. |
| 10,954,456 B2 | 3/2021 | Moore et al. |
| 10,961,468 B2 | 3/2021 | Moore et al. |
| 10,962,259 B2 | 3/2021 | Shah et al. |
| 10,968,403 B2 | 4/2021 | Moore |
| 11,021,662 B2 | 6/2021 | Moore et al. |
| 11,098,255 B2 | 8/2021 | Larsen et al. |
| 11,124,714 B2 | 9/2021 | Eller et al. |
| 11,136,513 B2 | 10/2021 | Moore et al. |
| 11,164,406 B2 | 11/2021 | Meroux et al. |
| 11,168,270 B1 | 11/2021 | Moore |
| 11,175,039 B2 | 11/2021 | Lochschmied et al. |
| 11,203,719 B2 | 12/2021 | Cantley et al. |
| 11,203,722 B2 | 12/2021 | Moore et al. |
| 11,214,741 B2 | 1/2022 | Davdov et al. |
| 11,306,253 B2 | 4/2022 | Timken et al. |
| 11,319,262 B2 | 5/2022 | Wu et al. |
| 11,352,577 B2 | 6/2022 | Woodchick et al. |
| 11,352,578 B2 | 6/2022 | Eller et al. |
| 11,384,301 B2 | 7/2022 | Eller et al. |
| 11,421,162 B2 | 8/2022 | Pradeep et al. |
| 11,460,478 B2 | 10/2022 | Sugiyama et al. |
| 11,467,172 B1 | 10/2022 | Mitzel et al. |
| 11,542,441 B2 | 1/2023 | Larsen et al. |
| 11,578,638 B2 | 2/2023 | Thobe |
| 11,634,647 B2 | 4/2023 | Cantley et al. |
| 11,667,858 B2 | 6/2023 | Eller et al. |
| 11,692,141 B2 | 7/2023 | Larsen et al. |
| 11,702,600 B2 | 7/2023 | Sexton et al. |
| 11,715,950 B2 | 8/2023 | Miller et al. |
| 11,720,526 B2 | 8/2023 | Miller et al. |
| 11,802,257 B2 | 10/2023 | Short et al. |
| 11,835,450 B2 | 12/2023 | Bledsoe, Jr. et al. |
| 11,860,069 B2 | 1/2024 | Bledsoe, Jr. |
| 11,891,581 B2 | 2/2024 | Cantley et al. |
| 11,898,109 B2 | 2/2024 | Sexton et al. |
| 11,905,468 B2 | 2/2024 | Sexton et al. |
| 11,905,479 B2 | 2/2024 | Eller et al. |
| 11,906,423 B2 | 2/2024 | Bledsoe, Jr. et al. |
| 11,920,096 B2 | 3/2024 | Woodchick et al. |
| 11,921,035 B2 | 3/2024 | Bledsoe, Jr. et al. |
| 2002/0014068 A1 | 2/2002 | Mittricker et al. |
| 2002/0061633 A1 | 5/2002 | Marsh |
| 2002/0170431 A1 | 11/2002 | Chang et al. |
| 2003/0041518 A1 | 3/2003 | Wallace et al. |
| 2003/0113598 A1 | 6/2003 | Chow et al. |
| 2003/0188536 A1 | 10/2003 | Mittricker |
| 2003/0194322 A1 | 10/2003 | Brandl et al. |
| 2004/0010170 A1 | 1/2004 | Vickers |
| 2004/0033617 A1 | 2/2004 | Sonbul |
| 2004/0040201 A1 | 3/2004 | Roos et al. |
| 2004/0079431 A1 | 4/2004 | Kissell |
| 2004/0121472 A1 | 6/2004 | Nemana et al. |
| 2004/0129605 A1 | 7/2004 | Goldstein et al. |
| 2004/0139858 A1 | 7/2004 | Entezarian |
| 2004/0154610 A1 | 8/2004 | Hopp et al. |
| 2004/0232050 A1 | 11/2004 | Martin et al. |
| 2004/0251170 A1 | 12/2004 | Chiyoda et al. |
| 2005/0042151 A1 | 2/2005 | Alward et al. |
| 2005/0088653 A1 | 4/2005 | Coates et al. |
| 2005/0123466 A1 | 6/2005 | Sullivan |
| 2005/0139516 A1 | 6/2005 | Nieskens et al. |
| 2005/0143609 A1 | 6/2005 | Wolf et al. |
| 2005/0150820 A1 | 7/2005 | Guo |
| 2005/0229777 A1 | 10/2005 | Brown |
| 2006/0037237 A1 | 2/2006 | Copeland et al. |
| 2006/0042701 A1 | 3/2006 | Jansen |
| 2006/0049082 A1 | 3/2006 | Niccum et al. |
| 2006/0091059 A1 | 5/2006 | Barbaro |
| 2006/0162243 A1 | 7/2006 | Wolf |
| 2006/0169305 A1 | 8/2006 | Jansen et al. |
| 2006/0210456 A1 | 9/2006 | Bruggendick |
| 2006/0169064 A1 | 10/2006 | Anschutz et al. |
| 2006/0220383 A1 | 10/2006 | Erickson |
| 2007/0003450 A1 | 1/2007 | Burdett et al. |
| 2007/0082407 A1 | 4/2007 | Little, III |
| 2007/0112258 A1 | 5/2007 | Soyemi et al. |
| 2007/0202027 A1 | 8/2007 | Walker et al. |
| 2007/0212271 A1 | 9/2007 | Kennedy et al. |
| 2007/0212790 A1 | 9/2007 | Welch et al. |
| 2007/0215521 A1 | 9/2007 | Havlik et al. |
| 2007/0243556 A1 | 10/2007 | Wachs |
| 2007/0283812 A1 | 12/2007 | Liu et al. |
| 2008/0078693 A1 | 4/2008 | Sexton et al. |

(56) References Cited

U.S. PATENT DOCUMENTS

| | | |
|---|---|---|
| 2008/0078694 A1 | 4/2008 | Sexton et al. |
| 2008/0078695 A1 | 4/2008 | Sexton et al. |
| 2008/0081844 A1 | 4/2008 | Shires et al. |
| 2008/0087592 A1 | 4/2008 | Buchanan |
| 2008/0092436 A1 | 4/2008 | Seames et al. |
| 2008/0109107 A1 | 5/2008 | Stefani et al. |
| 2008/0149486 A1 | 6/2008 | Greaney et al. |
| 2008/0156696 A1 | 7/2008 | Niccum et al. |
| 2008/0207974 A1 | 8/2008 | McCoy et al. |
| 2008/0211505 A1 | 9/2008 | Trygstad et al. |
| 2008/0247942 A1 | 10/2008 | Kandziora et al. |
| 2008/0253936 A1 | 10/2008 | Abhari |
| 2009/0151250 A1 | 6/2009 | Agrawal |
| 2009/0152454 A1 | 6/2009 | Nelson et al. |
| 2009/0158824 A1 | 6/2009 | Brown et al. |
| 2010/0127217 A1 | 5/2010 | Lightowlers et al. |
| 2010/0131247 A1 | 5/2010 | Carpenter et al. |
| 2010/0166602 A1 | 7/2010 | Bacik |
| 2010/0243235 A1 | 9/2010 | Caldwell et al. |
| 2010/0301044 A1 | 12/2010 | Sprecher |
| 2010/0318118 A1 | 12/2010 | Forsell |
| 2011/0147267 A1 | 6/2011 | Kaul et al. |
| 2011/0155646 A1 | 6/2011 | Karas et al. |
| 2011/0175032 A1 | 7/2011 | Günther |
| 2011/0186307 A1 | 8/2011 | Derby |
| 2011/0237856 A1 | 9/2011 | Mak |
| 2011/0247835 A1 | 10/2011 | Crabb |
| 2011/0277377 A1 | 11/2011 | Novak et al. |
| 2011/0299076 A1 | 12/2011 | Feitisch et al. |
| 2011/0319698 A1 | 12/2011 | Sohn et al. |
| 2012/0012342 A1 | 1/2012 | Wilkin et al. |
| 2012/0125813 A1 | 5/2012 | Bridges et al. |
| 2012/0125814 A1 | 5/2012 | Sanchez et al. |
| 2012/0131853 A1 | 5/2012 | Thacker et al. |
| 2012/0222550 A1 | 9/2012 | Ellis |
| 2012/0272715 A1 | 11/2012 | Kriel et al. |
| 2013/0014431 A1 | 1/2013 | Jin et al. |
| 2013/0109895 A1 | 5/2013 | Novak et al. |
| 2013/0112313 A1 | 5/2013 | Donnelly et al. |
| 2013/0125619 A1 | 5/2013 | Wang |
| 2013/0186739 A1 | 7/2013 | Trompiz |
| 2013/0192339 A1 | 8/2013 | Kriel et al. |
| 2013/0225897 A1 | 8/2013 | Candelon et al. |
| 2013/0288355 A1 | 10/2013 | DeWitte et al. |
| 2013/0334027 A1 | 12/2013 | Winter et al. |
| 2013/0342203 A1 | 12/2013 | Trygstad et al. |
| 2014/0019052 A1 | 1/2014 | Zaeper et al. |
| 2014/0024873 A1 | 1/2014 | De Haan et al. |
| 2014/0041150 A1 | 2/2014 | Sjoberg |
| 2014/0121428 A1 | 5/2014 | Wang et al. |
| 2014/0229010 A1 | 8/2014 | Farquharson et al. |
| 2014/0296057 A1 | 10/2014 | Ho et al. |
| 2014/0299515 A1 | 10/2014 | Weiss et al. |
| 2014/0311953 A1 | 10/2014 | Chimenti et al. |
| 2014/0316176 A1 | 10/2014 | Fjare et al. |
| 2014/0332444 A1 | 11/2014 | Weiss et al. |
| 2014/0353138 A1 | 12/2014 | Amale et al. |
| 2014/0374322 A1 | 12/2014 | Venkatesh |
| 2015/0005547 A1 | 1/2015 | Freel et al. |
| 2015/0005548 A1 | 1/2015 | Freel et al. |
| 2015/0034570 A1 | 2/2015 | Andreussi |
| 2015/0034599 A1 | 2/2015 | Hunger et al. |
| 2015/0057477 A1 | 2/2015 | Ellig et al. |
| 2015/0071028 A1 | 3/2015 | Glanville |
| 2015/0122704 A1 | 5/2015 | Kumar et al. |
| 2015/0166426 A1 | 6/2015 | Wegerer et al. |
| 2015/0240167 A1 | 8/2015 | Kulprathipanja et al. |
| 2015/0240174 A1 | 8/2015 | Bru et al. |
| 2015/0337207 A1 | 11/2015 | Chen et al. |
| 2015/0337225 A1 | 11/2015 | Droubi et al. |
| 2015/0337226 A1 | 11/2015 | Tardif et al. |
| 2015/0353851 A1 | 12/2015 | Buchanan |
| 2016/0090539 A1 | 3/2016 | Frey et al. |
| 2016/0122662 A1 | 5/2016 | Weiss et al. |
| 2016/0122666 A1 | 5/2016 | Weiss et al. |
| 2016/0160139 A1 | 6/2016 | Dawe et al. |
| 2016/0168481 A1 | 6/2016 | Ray et al. |
| 2016/0244677 A1 | 8/2016 | Froehle |
| 2016/0298851 A1 | 10/2016 | Brickwood et al. |
| 2016/0312127 A1 | 10/2016 | Frey et al. |
| 2016/0312130 A1 | 10/2016 | Majcher et al. |
| 2017/0009163 A1 | 1/2017 | Kraus et al. |
| 2017/0115190 A1 | 4/2017 | Hall et al. |
| 2017/0131728 A1 | 5/2017 | Lambert et al. |
| 2017/0151526 A1 | 6/2017 | Cole |
| 2017/0183575 A1 | 6/2017 | Rubin-Pitel et al. |
| 2017/0198910 A1 | 7/2017 | Garg |
| 2017/0226434 A1 | 8/2017 | Zimmerman |
| 2017/0233670 A1 | 8/2017 | Feustel et al. |
| 2017/0269559 A1 | 9/2017 | Trygstad |
| 2018/0017469 A1 | 1/2018 | English et al. |
| 2018/0037308 A1 | 2/2018 | Lee et al. |
| 2018/0080958 A1 | 3/2018 | Marchese et al. |
| 2018/0119039 A1 | 5/2018 | Tanaka et al. |
| 2018/0134974 A1 | 5/2018 | Weiss et al. |
| 2018/0163144 A1 | 6/2018 | Weiss et al. |
| 2018/0179457 A1 | 6/2018 | Mukherjee et al. |
| 2018/0202607 A1 | 7/2018 | McBride |
| 2018/0230389 A1 | 8/2018 | Moore et al. |
| 2018/0246142 A1 | 8/2018 | Glover |
| 2018/0355263 A1 | 12/2018 | Moore et al. |
| 2018/0361312 A1 | 12/2018 | Dutra e Mello et al. |
| 2018/0371325 A1 | 12/2018 | Streiff et al. |
| 2019/0002772 A1 | 1/2019 | Moore et al. |
| 2019/0010405 A1 | 1/2019 | Moore et al. |
| 2019/0010408 A1 | 1/2019 | Moore et al. |
| 2019/0016980 A1 | 1/2019 | Kar et al. |
| 2019/0093026 A1 | 3/2019 | Wohaibi et al. |
| 2019/0099706 A1 | 4/2019 | Sampath |
| 2019/0100702 A1 | 4/2019 | Cantley et al. |
| 2019/0127651 A1 | 5/2019 | Kar et al. |
| 2019/0128160 A1 | 5/2019 | Peng |
| 2019/0136144 A1 | 5/2019 | Wohaibi et al. |
| 2019/0153340 A1 | 5/2019 | Weiss et al. |
| 2019/0153942 A1 | 5/2019 | Wohaibi et al. |
| 2019/0169509 A1 | 6/2019 | Cantley et al. |
| 2019/0185772 A1 | 6/2019 | Berkhous et al. |
| 2019/0201841 A1 | 7/2019 | McClelland |
| 2019/0203130 A1 | 7/2019 | Mukherjee |
| 2019/0218466 A1 | 7/2019 | Slade et al. |
| 2019/0233741 A1 | 8/2019 | Moore et al. |
| 2019/0292465 A1 | 9/2019 | McBride |
| 2019/0338205 A1 | 11/2019 | Ackerson et al. |
| 2019/0382668 A1 | 12/2019 | Klussman et al. |
| 2019/0382672 A1 | 12/2019 | Sorensen |
| 2020/0041481 A1 | 2/2020 | Burgess |
| 2020/0049675 A1 | 2/2020 | Ramirez |
| 2020/0080881 A1 | 3/2020 | Langlois et al. |
| 2020/0095509 A1 | 3/2020 | Moore et al. |
| 2020/0123458 A1 | 4/2020 | Moore et al. |
| 2020/0181502 A1 | 6/2020 | Paasikallio et al. |
| 2020/0199462 A1 | 6/2020 | Klussman et al. |
| 2020/0208068 A1 | 7/2020 | Hossain et al. |
| 2020/0246743 A1 | 8/2020 | Sorensen |
| 2020/0291316 A1 | 9/2020 | Robbins et al. |
| 2020/0312470 A1 | 10/2020 | Craig et al. |
| 2020/0316513 A1 | 10/2020 | Zhao |
| 2020/0332198 A1 | 10/2020 | Yang et al. |
| 2020/0378600 A1 | 12/2020 | Craig et al. |
| 2020/0385644 A1 | 12/2020 | Rogel et al. |
| 2021/0002559 A1 | 1/2021 | Larsen et al. |
| 2021/0003502 A1 | 1/2021 | Kirchmann et al. |
| 2021/0033631 A1 | 2/2021 | Field et al. |
| 2021/0103304 A1 | 4/2021 | Fogarty et al. |
| 2021/0115344 A1 | 4/2021 | Perkins et al. |
| 2021/0181164 A1 | 6/2021 | Shirkhan et al. |
| 2021/0213382 A1 | 7/2021 | Cole |
| 2021/0238487 A1 | 8/2021 | Moore et al. |
| 2021/0253964 A1 | 8/2021 | Eller et al. |
| 2021/0253965 A1 | 8/2021 | Woodchick et al. |
| 2021/0261874 A1 | 8/2021 | Eller et al. |
| 2021/0284919 A1 | 9/2021 | Moore et al. |
| 2021/0292661 A1 | 9/2021 | Klussman et al. |
| 2021/0301210 A1 | 9/2021 | Timken et al. |

(56) References Cited

U.S. PATENT DOCUMENTS

| | | |
|---|---|---|
| 2021/0396660 A1 | 12/2021 | Zarrabian |
| 2021/0403819 A1 | 12/2021 | Moore et al. |
| 2022/0040629 A1 | 2/2022 | Edmoundson et al. |
| 2022/0041940 A1 | 2/2022 | Pradeep et al. |
| 2022/0048019 A1 | 2/2022 | Zalewski et al. |
| 2022/0268694 A1 | 8/2022 | Bledsoe et al. |
| 2022/0298440 A1 | 9/2022 | Woodchick et al. |
| 2022/0299170 A1 | 9/2022 | Raynor et al. |
| 2022/0343229 A1 | 10/2022 | Gruber et al. |
| 2022/0357303 A1 | 11/2022 | Zhu et al. |
| 2023/0015077 A1 | 1/2023 | Kim |
| 2023/0078852 A1 | 3/2023 | Campbell et al. |
| 2023/0080192 A1 | 3/2023 | Bledsoe et al. |
| 2023/0082189 A1 | 3/2023 | Bledsoe et al. |
| 2023/0084329 A1 | 3/2023 | Bledsoe et al. |
| 2023/0087063 A1 | 3/2023 | Mitzel et al. |
| 2023/0089935 A1 | 3/2023 | Bledsoe et al. |
| 2023/0093452 A1 | 3/2023 | Sexton et al. |
| 2023/0111609 A1 | 4/2023 | Sexton et al. |
| 2023/0113140 A1 | 4/2023 | Larsen et al. |
| 2023/0118319 A1 | 4/2023 | Sexton et al. |
| 2023/0220286 A1 | 7/2023 | Cantley et al. |
| 2023/0241548 A1 | 8/2023 | Holland et al. |
| 2023/0242837 A1 | 8/2023 | Short et al. |
| 2023/0259080 A1 | 8/2023 | Whikehart et al. |
| 2023/0259088 A1 | 8/2023 | Borup et al. |
| 2023/0272290 A1 | 8/2023 | Larsen et al. |
| 2023/0295528 A1 | 9/2023 | Eller et al. |
| 2023/0332056 A1 | 10/2023 | Larsen et al. |
| 2023/0332058 A1 | 10/2023 | Larsen et al. |
| 2023/0357649 A1 | 11/2023 | Sexton et al. |
| 2023/0400184 A1 | 12/2023 | Craig |
| 2023/0416615 A1 | 12/2023 | Larsen |
| 2023/0416638 A1 | 12/2023 | Short |
| 2024/0011898 A1 | 1/2024 | Bledsoe, Jr. et al. |

FOREIGN PATENT DOCUMENTS

| | | | | |
|---|---|---|---|---|
| CA | 2949201 | 11/2015 | | |
| CA | 2822742 | 12/2016 | | |
| CA | 3009808 | 7/2017 | | |
| CA | 2904903 | 8/2020 | | |
| CA | 3077045 | 9/2020 | | |
| CA | 2947431 | 3/2021 | | |
| CA | 3004712 | 6/2021 | | |
| CA | 2980055 | 12/2021 | | |
| CA | 2879783 | 1/2022 | | |
| CA | 2991614 | 1/2022 | | |
| CA | 2980069 | 11/2022 | | |
| CA | 3109606 | 12/2022 | | |
| CH | 432129 | 3/1967 | | |
| CN | 2128346 | 3/1993 | | |
| CN | 201264907 Y | 7/2009 | | |
| CN | 201306736 | 9/2009 | | |
| CN | 201940168 | 8/2011 | | |
| CN | 102120138 | 12/2012 | | |
| CN | 203453713 | 2/2014 | | |
| CN | 203629938 | 6/2014 | | |
| CN | 203816490 | 9/2014 | | |
| CN | 104353357 | 2/2015 | | |
| CN | 204170623 | 2/2015 | | |
| CN | 103331093 | 4/2015 | | |
| CN | 204253221 | 4/2015 | | |
| CN | 204265565 | 4/2015 | | |
| CN | 105148728 | 12/2015 | | |
| CN | 204824775 | 12/2015 | | |
| CN | 103933845 | 1/2016 | | |
| CN | 105289241 | 2/2016 | | |
| CN | 105536486 | 5/2016 | | |
| CN | 105804900 | 7/2016 | | |
| CN | 103573430 | 8/2016 | | |
| CN | 205655095 | 10/2016 | | |
| CN | 104326604 | 11/2016 | | |
| CN | 104358627 | 11/2016 | | |
| CN | 106237802 | 12/2016 | | |
| CN | 205779365 | 12/2016 | | |
| CN | 106407648 | 2/2017 | | |
| CN | 105778987 | 8/2017 | | |
| CN | 207179722 | 4/2018 | | |
| CN | 207395575 | 5/2018 | | |
| CN | 108179022 | 6/2018 | | |
| CN | 108704478 | 10/2018 | | |
| CN | 109126458 | 1/2019 | | |
| CN | 109423345 | 3/2019 | | |
| CN | 109499365 | 3/2019 | | |
| CN | 109705939 | 5/2019 | | |
| CN | 109722303 | 5/2019 | | |
| CN | 110129103 | 8/2019 | | |
| CN | 110229686 | 9/2019 | | |
| CN | 209451617 | 10/2019 | | |
| CN | 110987862 | 4/2020 | | |
| CN | 111336612 A | 6/2020 | | |
| CN | 213824075 U | 7/2021 | | |
| CN | 215263512 U | 12/2021 | | |
| CN | 215288592 | 12/2021 | | |
| CN | 113963818 | 1/2022 | | |
| CN | 114001278 | 2/2022 | | |
| CN | 217431673 | 9/2022 | | |
| CN | 218565442 | 3/2023 | | |
| DE | 10179 | 6/1912 | | |
| DE | 3721725 | 1/1989 | | |
| DE | 19619722 | 11/1997 | | |
| DE | 102010017563 | 12/2011 | | |
| DE | 102014009231 A1 | 1/2016 | | |
| EP | 0142352 A2 * | 5/1985 | ............. | B01J 29/38 |
| EP | 0527000 | 2/1993 | | |
| EP | 0783910 A1 | 7/1997 | | |
| EP | 0949318 | 10/1999 | | |
| EP | 0783910 B1 | 12/2000 | | |
| EP | 0801299 | 3/2004 | | |
| EP | 1413712 | 4/2004 | | |
| EP | 1600491 | 11/2005 | | |
| EP | 1870153 | 12/2007 | | |
| EP | 2047905 | 4/2009 | | |
| EP | 2955345 | 12/2015 | | |
| EP | 3130773 | 2/2017 | | |
| EP | 3139009 | 3/2017 | | |
| EP | 3239483 | 11/2017 | | |
| EP | 3085910 | 8/2018 | | |
| EP | 3355056 | 8/2018 | | |
| EP | 2998529 | 2/2019 | | |
| EP | 3441442 | 2/2019 | | |
| EP | 3569988 | 11/2019 | | |
| EP | 3878926 | 9/2021 | | |
| FR | 2357630 | 2/1978 | | |
| FR | 3004722 | 3/2016 | | |
| FR | 3027909 | 5/2016 | | |
| FR | 3067036 | 12/2018 | | |
| FR | 3067037 | 12/2018 | | |
| FR | 3072684 | 4/2019 | | |
| FR | 3075808 | 6/2019 | | |
| GB | 775273 | 5/1957 | | |
| GB | 933618 | 8/1963 | | |
| GB | 1207719 | 10/1970 | | |
| GB | 2144526 | 3/1985 | | |
| IN | 202111016535 | 7/2021 | | |
| JP | 59220609 | 12/1984 | | |
| JP | 2003129067 | 5/2003 | | |
| JP | 3160405 | 6/2010 | | |
| JP | 2015059220 | 3/2015 | | |
| JP | 2019014275 | 1/2019 | | |
| KR | 101751923 | 7/2017 | | |
| KR | 101823897 | 3/2018 | | |
| KR | 20180095303 | 8/2018 | | |
| KR | 20190004474 | 1/2019 | | |
| KR | 20190004475 | 1/2019 | | |
| RU | 2673558 | 11/2018 | | |
| RU | 2700705 | 9/2019 | | |
| RU | 2760879 | 12/2021 | | |
| TW | 320682 | 11/1997 | | |
| WO | 94/08225 | 4/1994 | | |
| WO | 199640436 | 12/1996 | | |
| WO | 1997033678 | 9/1997 | | |
| WO | 199803249 | 1/1998 | | |

(56) References Cited

FOREIGN PATENT DOCUMENTS

| | | |
|---|---|---|
| WO | 1999041591 | 8/1999 |
| WO | 2001051588 | 7/2001 |
| WO | 2002038295 | 5/2002 |
| WO | 2006126978 | 11/2006 |
| WO | 2008088294 | 7/2008 |
| WO | 2010/144191 | 12/2010 |
| WO | 2012026302 | 3/2012 |
| WO | 2012062924 | 5/2012 |
| WO | 2012089776 | 7/2012 |
| WO | 2012108584 | 8/2012 |
| WO | 2014053431 | 4/2014 |
| WO | 2014096703 | 6/2014 |
| WO | 2014096704 | 6/2014 |
| WO | 2014191004 | 7/2014 |
| WO | 2014177424 | 11/2014 |
| WO | 2014202815 | 12/2014 |
| WO | 2016167708 | 10/2016 |
| WO | 2017067088 | 4/2017 |
| WO | 2017207976 | 12/2017 |
| WO | 2018017664 | 1/2018 |
| WO | 2018073018 | 4/2018 |
| WO | 2018122274 | 7/2018 |
| WO | 2018148675 | 8/2018 |
| WO | 2018148681 | 8/2018 |
| WO | 2018231105 | 12/2018 |
| WO | 2019053323 | 3/2019 |
| WO | 2019104243 | 5/2019 |
| WO | 2019155183 | 8/2019 |
| WO | 2019178701 | 9/2019 |
| WO | 2020160004 | 8/2020 |
| WO | 2021058289 | 4/2021 |
| WO | 2022133359 | 6/2022 |
| WO | 2022144495 | 7/2022 |
| WO | 2022149501 | 7/2022 |
| WO | 2022219234 | 10/2022 |
| WO | 2022220991 | 10/2022 |
| WO | 2023038579 | 3/2023 |
| WO | 2023137304 | 7/2023 |
| WO | 2023164683 | 8/2023 |
| WO | 2023242308 | 12/2023 |

OTHER PUBLICATIONS

Pashikanti et al., Predictive modeling of large-scale integrated refinery reaction and fractionation systems from plant data. Part 3: Continuous Catalyst Regeneration (CCR) Reforming Process, 2011, 25, 5320-5344 (Year: 2011).*
1 Lloyd's Register, Using technology to trace the carbon intensity of sustainable marine fuels, Feb. 15, 2023.
Platvoet et al., Process Burners 101, American Institute of Chemical Engineers, Aug. 2013.
Luyben, W. L., Process Modeling, Simulation, and Control for Chemical Engineers, Feedforward Control, pp. 431-433.
Cooper et al., Calibration transfer of near-IR partial least squares property models of fuels using standards, Wiley Online Library, Jul. 19, 2011.
ABB Measurement & Analytics, Using FT-NIR as a Multi-Stream Method for CDU Optimization, Nov. 8, 2018.
Modcon Systems Ltd., On-Line NIR Analysis of Crude Distillation Unit, Jun. 2008.
ABB Measurement & Analytics, Crude distillation unit (CDU) optimization, 2017.
Guided Wave Inc., The Role of NIR Process Analyzers in Refineries to Process Crude Oil into Useable Petrochemical Products, 2021.
ABB Measurement & Analytics, Optimizing Refinery Catalytic Reforming Units with the use of Simple Robust On-Line Analyzer Technology, Nov. 27, 2017, https://www.azom.com/article.aspx?ArticleID=14840.
Bueno, Alexis et al., Characterization of Catalytic Reforming Streams by NIR Spectroscopy, Energy & Fuels 2009, 23, 3172-3177, Apr. 29, 2009.
Caricato, Enrico et al., Catalytic Naphtha Reforming—a Novel Control System for the Bench-Scale Evaluation of Commerical Continuous Catalytic Regeneration Catalysts, Industrial of Engineering Chemistry Research, ACS Publications, May 18, 2017.
Alves, J. C. L., et al., Diesel Oil Quality Parameter Determinations Using Support Vector Regression and Near Infrared Spectroscopy for Hydrotreationg Feedstock Monitoring, Journal of Near Infrared Spectroscopy, 20, 419-425 (2012), Jul. 23, 2012.
Rodriguez, Elena et al., Coke deposition and product distribution in the co-cracking of waste polyolefin derived streams and vacuum gas oil under FCC unit conditions, Fuel Processing Technology 192 (2019), 130-139.
Passamonti, Francisco J. et al., Recycling of waste plastics into fuels, PDPE conversion in FCC, Applied Catalysis B: Environmental 125 (2012), 499-506.
De Rezende Pinho, Andrea et al., Fast pyrolysis oil from pinewood chips co-processing with vacuum gas oil in an FCC unit for second generation fuel production, Fuel 188 (2017), 462-473.
Niaei et al., Computational Study of Pyrolysis Reactions and Coke Deposition in Industrial Naphtha Cracking, P.M.A. Sloot et al., Eds.: ICCS 2002, LNCS 2329, pp. 723-732, 2002.
Hanson et al., An atmospheric crude tower revamp, Digital Refining, Article, Jul. 2005.
Lopiccolo, Philip, Coke trap reduces FCC slurry exchanger fouling for Texas refiner, Oil & Gas Journal, Sep. 8, 2003.
Martino, Germain, Catalytic Reforming, Petroleum Refining Conversion Processes, vol. 3, Chapter 4, pp. 101-168, 2001.
Baukal et al., Natural-Draft Burners, Industrial Burners Handbook, CRC Press 2003.
Spekuljak et al., Fluid Distributors for Structured Packing Colums, AICHE, Nov. 1998.
Hemler et al., UOP Fluid Catalytic Cracking Process, Handbook of Petroleum Refining Processes, 3rd ed., McGraw Hill, 2004.
United States Department of Agriculture, NIR helps Turn Vegetable Oil into High-Quality Biofuel, Agricultural Research Service, Jun. 15, 1999.
NPRA, 2006 Cat Cracker Seminar Transcript, National Petrochemical & Refiners Association, Aug. 1-2, 2006.
Niccum, Phillip K. et al. KBR, CatCracking.com, More Production—Less Risk!, Twenty Questions: Identify Probably Cuase of High FCC Catalyst Loss, May 3-6, 2011.
NPRA, Cat-10-105 Troubleshooting FCC Catalyst Losses, National Petrochemical & Refiners Association, Aug. 24-25, 2010.
Fraser, Stuart, Distillation in Refining, Distillation Operation and Applications (2014), pp. 155-190 (Year: 2014).
Yasin et al., Quality and chemistry of crude oils, Journal of Petroleum Technology and Alternative Fuels, vol. 4(3), pp. 53-63, Mar. 2013.
Penn State, Cut Points, https://www.e-education.psu.edu/fsc432/content/cut-points, 2018.
The American Petroleum Institute, Petroleum HPV Testing Group, Heavy Fuel Oils Category Analysis and Hazard Characterization, Dec. 7, 2012.
Increase Gasoline Octane and Light Olefin Yeilds with ZSM-5, vol. 5, Issue 5, http://www.refiningonline.com/engelhardkb/crep/TCR4_35.htm.
Fluid Catalytic Cracking and Light Olefins Production, Hydrocarbon Publishing Company, 2011, http://www.hydrocarbonpublishing.com/store10/product.php?productid+b21104.
Zhang et al., Multifunctional two-stage riser fluid catalytic cracking process, Springer Applied Petrocchemical Research, Sep. 3, 2014.
Reid, William, Recent trends in fluid catalytic cracking patents, part V: reactor section, Dilworth IP, Sep. 3, 2014.
Akah et al., Maximizing propylene production via FCC technology, SpringerLink, Mar. 22, 2015.
Vogt et al., Fluid Catalytic Cracking: Recent Developments on the Grand Old Lady of Zeolite Catalysis, Royal Society of Chemistry, Sep. 18, 2015.
Zhou et al., Study on the Integration of Flue Gas Waste He Desulfuization and Dust Removal in Civilian Coalfired Heating Furnance, 2020 IOP Conf. Ser.: Earth Environ. Sci. 603 012018.
Vivek et al., Assessment of crude oil blends, refiner's assessment of the compatibility of opportunity crudes in blends aims to avoid the (56) References Cited

OTHER PUBLICATIONS processing problems introduced by lower-quality feedstocks, www.digitalrefining.com/article/10000381, 2011.
International Standard, ISO 8217, Petroleum products—Fuels (class F)—Specifications of marine fuels, Sixth Edition, 2017.
International Standard, ISO 10307-1, Petroleum products—Total sediment in residual fuel oils—, Part 1: Determination by hot filtration, Second Edition, 2009.
International Standard, ISO 10307-2, Petroleum products—Total sediment in residual fuel oils—, Part 2: Determination using standard procedures for aging, Second Edition, 2009.
Zulkefi et al., Overview of H2S Removal Technologies from Biogas Production, International Journal of Applied Engineering Research ISSN 0973-4562, vol. 11, No. 20, pp. 10060-10066, © Research India Publications, 2016.
Morozov et al., Best Practices When Operating a Unit for Removing Hydrogen Sulfide from Residual Fuel Oil, Chemistry and Technology of Fuels and Oils, vol. 57, No. 4, Sep. 2001.
Calbry-Muzyka et al., Deep removal of sulfur and trace organic compounds from biogas to protect a catalytic methananation reactor, Chemical Engineering Joural 360, pp. 577-590, 2019.
Cheah et al., Review of Mid- to High-Tempearture Sulfur Sorbents for Desulfurization of Biomass- and Coal-derived Syngas, Energy Fuels 2009, 23, pp. 5291-5307, Oct. 16, 2019.
Mandal et al., Simultaneous absorption of carbon dioxide of hydrogen sulfide into aqueous blends of 2-amino-2-methyl-1 propanol and diethanolamine, Chemical Engineering Science 60, pp. 6438-6451, 2005.
Meng et al., In bed and downstream hot gas desulphurization during solid fuel gasification: A review, Fuel Processing Technology 91, pp. 964-981, 2010.
Okonkwo et al., Role of Amine Structure on Hydrogen Sulfide Capture from Dilute Gas Streams Using Solid Adsorbents, Energy Fuels, 32, pp. 6926-6933, 2018.
Okonkwo et al., Selective removal of hydrogen sulfide from simulated biogas streams using sterically hindered amine adsorbents, Chemical Engineering Journal 379, pp. 122-349, 2020.
Seo et al., Methanol absorption characteristics for the removal of H2S (hydrogen sulfide), COS (carbonyl sulfide) and CO2 (carbon dioxide) in a pilot-scale biomass-to-liquid process, Energy 66, pp. 56-62, 2014.
"Development of Model Equations for Predicting Gasoline Blending Properties", Odula et al., American Journal of Chemical Engineering, vol. 3, No. 2-1, 2015, pp. 9-17.
Lerh et al., Feature: IMO 2020 draws more participants into Singapore's bunkering pool., S&P Global Platts, www.spglobal.com, Sep. 3, 2019.
Cremer et al., Model Based Assessment of the Novel Use of Sour Water Stripper Vapor for NOx Control in CO Boilers, Industrial Combustion Symposium, American Flame Research Committee 2021, Nov. 19, 2021.
Frederick et al., Alternative Technology for Sour Water Stripping, University of Pennsylvania, Penn Libraries, Scholarly Commons, Apr. 20, 2018.
Da Vinci Laboratory Solutions B. V., DVLS Liquefied Gas Injector, Sampling and analysis of liquefied gases, https://www.davinci-ls.com/en/products/dvls-products/dvls-liquefied-gas-injector.
Wasson ECE Instrumentation, LPG Pressurization Station, https://wasson-ece.com/products/small-devices/lpg-pressurization-station.
Mechatest B. V., Gas & Liquefied Gas Sampling Systems, https://www.mechatest.com/products/gas-sampling-system/.
La Rivista dei Combustibili, The Fuel Magazine, vol. 66, File 2, 2012.
Bollas et al., "Modeling Small-Diameter FCC Riser Reactors. A Hydrodynamic and Kinetic Approach", Industrial and Engineering Chemistry Research, 41(22), 5410-5419, 2002.
Voutetakis et al., "Computer Application and Software Development for the Automation of a Fluid Catalytic Cracking Pilot Plant—Experimental Results", Computers & Chemical Engineering, vol. 20 Suppl., S1601-S1606, 1996.
Doolin, et al., Catalyst Regeneration and Continuous Reforming Issues, Catalytic Naptha Reforming, 2004.
Swagelok, Grab Sampling Systems Application Guide, 53 pages.
Frank et al., "Fuel Tank and Charcoal Canister Fire Hazards during EVAP System Leak Testing", SAE International, 2007 World Congress, Detroit, Michigan, Apr. 16-19, 2007, 11 pages.

\* cited by examiner

METHODS AND REFORMING SYSTEMS FOR RE-DISPERSING PLATINUM ON REFORMING CATALYST

CROSS-REFERENCE TO RELATED APPLICATIONS

The present application claims priority to U.S. Provisional Application No. 62/845,485 filed May 9, 2019, the disclosure of which is incorporated herein by reference in its entirety.

FIELD OF THE DISCLOSURE

The disclosure herein relates to methods and systems for evaluating or controlling the platinum re-dispersion on reforming catalysts used in a continuous catalyst regeneration (CCR) reformer system.

BACKGROUND

Catalytic processes for the conversion of hydrocarbons using platinum group metals and a catalyst support are well known and extensively used. For example, metal-containing reforming catalysts can be used in continuous catalyst regeneration (CCR) reforming processes as understood by those skilled in the art, and such catalysts are commonly referred to as CCR reforming catalysts. CCR reforming processes may generally be referred to as "catalytic reforming" processes. One CCR reforming process is the catalytic reforming of naphtha. In such a process, the naphtha is co-processed with hydrogen over platinum-containing reforming catalysts, for example, as described in more detail in U.S. Pat. No. 8,778,823 to Oyekan et al. During naphtha (and other types of) reforming, the catalyst becomes deactivated, attributed at least in part to the accumulation of coke deposits. Reconditioning of the catalyst to remove coke deposits is necessary to restore the activity of the catalyst. Coke is normally removed from deactivated catalyst by contacting the coke-containing catalyst at high temperature with an oxygen-containing gas to combust and to essentially convert the coke to carbon dioxide and water in a regeneration process. Cycling the catalyst particles between the reducing conditions of the reactor and the oxidizing conditions of the regenerator can lead to platinum agglomeration and can degrade catalyst activity.

In a commercial setting, CCR reforming processes are commonly conducted within an integrated processing unit which contains equipment, catalyst(s), sorbent(s) and chemical(s) used in the reaction. The equipment can include, e.g., reactors, reactor internals for distributing feed and containing catalyst, other vessels, heaters, heat exchangers, conduits, valves, pumps, compressors and associated components known to those of skilled in the art. For example, a catalytic-reforming system may have various sections, including a reaction section (wherein the desired reaction occurs, catalyzed by the CCR reforming catalyst) and a regeneration section (wherein spent CCR reforming catalyst is regenerated). The regeneration section typically includes various zones, including, e.g., a burn zone, a halogenation zone, and a drying zone. Typically, these separate zones are contained within a single regeneration vessel and may be in serial progression, for example. Equipment and technology for continuously or semi-continuously removing catalyst particles from reaction sections and for coke removal in regeneration sections of such systems are generally known.

In order to combust coke buildup on catalyst particles, such spent catalyst particles are generally passed from the reaction section into the regeneration section. A regeneration gas, having a low concentration of oxygen, is continuously circulated within the regeneration section. The first zone of the regeneration section, into which the particles are passed, is a burn zone wherein coke combustion is carefully controlled by limiting the oxygen concentration. From the burn zone, a flue gas containing oxygen, water, and the byproducts of coke combustion is continually withdrawn. Coke combustion is controlled by contacting the coke-containing catalyst particles passing through the regeneration section with the regeneration gas that is continuously recirculated within the regeneration section. The controlled burn limits the temperature exotherm experienced by the catalyst. A small stream of combustion gas is added to the regeneration gas so as to replace the oxygen consumed in the combustion of coke and a small amount of the flue gas is vented off from the regeneration gas to allow for the addition of the combustion gas. The addition of combustion gas and the venting of flue gas establish a steady state condition that produces a nearly constant average concentration of water and oxygen in the regeneration gas. Despite the controlled conditions, platinum atoms slowly agglomerate and a re-dispersion step is necessary.

After the burn zone, the spent metal-containing catalyst particles are passed to a halogenation zone. In this zone, chlorine and/or another halogen circulates through the zone in a halogenation loop. Spent catalyst that has passed through the burn zone as referenced above commonly exhibit platinum agglomeration. Platinum agglomeration is a major factor contributing to poor performance of commercial CCR catalyst and may affect the activity, selectivity, and stability of reforming catalysts. To renew the reforming activity, therefore, the coke-free catalyst exiting the burn zone is passed to the halogenation zone where the platinum atoms are re-dispersed on the reforming catalyst. The halogenation zone of the regeneration section is designed to control halogen levels, oxygen levels, moisture content, and temperature to re-disperse the platinum (or other metal) associated with the catalyst. Contacting the catalyst with the halogenation gas re-disperses platinum group metals on the catalyst particles and adds some halogen to replace halogen lost from the catalyst during naphtha processing. The halogen gas added to the halogenation loop may enter the loop in admixture with air or other oxygen-containing gas. The process that occurs in the halogenation zone re-disperses the platinum group metals on the catalyst and is referred to as "white burn" when employed after the regenerator burn zone, as described previously.

From the halogenation zone, the catalyst particles are passed into a drying zone. A heated gas contacts the catalyst particles and drives moisture from the particles. Typically, the heated gas is air or an oxygen-containing gas that is introduced to the drying zone as the drying medium and passes upward through the halogenation zone to the burn zone to also provide the combustion gas therein. Following the drying zone, regenerated catalysts particles are cycled back to the reaction section to complete the continuous flow through the reaction and regeneration sections.

Conditions for such regeneration processes (and, in particular, conditions in the halogenation zone of the regenerator section) have not been extensively studied to allow for testing and/or evaluation of various reforming catalysts (e.g., commercially available catalysts) and/or various process conditions prior to commercial use.

SUMMARY OF THE DISCLOSURE

Applicant has recognized that it would be advantageous to develop methods and systems for evaluating the platinum re-dispersion of various CCR catalysts in CCR reformer systems, controlling and/or simulating the oxychlorination conditions present in commercial halogenation zones in small-scale reactors, easily comparing the re-dispersion of various commercial catalysts, and improving the selectivity and activity of such catalysts via selection of appropriate regeneration conditions.

Accordingly, the disclosure herein provides one or more embodiments of methods of evaluating platinum re-dispersion in the context of reformer operation. The disclosure also provides one or more embodiments of methods of controlling platinum re-dispersion in the context of reformer operation. In some embodiments, the disclosure provides a method of evaluating the characteristics of various reforming catalysts used in CCR reformer systems. Such processes and methods advantageously provide for the control of one or more oxychlorination conditions (e.g., catalyst chloride level, time, temperature, and/or oxygen level) in a small-scale reactor. This may occur, for example, by providing the ability to directly compare the re-dispersion of different CCR catalysts under varying conditions and reaction atmospheres. The parameters of these methods may be controlled or adjusted, for example, to improve the activity or selectivity of the reforming catalysts used therein. In some embodiments, such parameters may then be applied on a larger scale, e.g., to provide enhanced reaction efficiency.

Some aspects of the disclosure provide methods of evaluating the platinum re-dispersion of a reforming catalyst in a small-scale reactor for use in a continuous regeneration system for a reforming process. The small, lab-scale re-dispersion process can be used to identify or rule out problems with the commercial regenerator. For example, a poorly dispersed catalyst sample can be subjected to the small-scale re-dispersion process; if the platinum dispersion is restored in the small-scale re-dispersion process, the commercial regeneration conditions can be adjusted accordingly, or if the platinum dispersion is not restored in the small-scale re-dispersion process, this may indicate that the catalyst has been poisoned.

Another aspect of the disclosure provides methods of evaluating platinum re-dispersion of a reforming catalyst in a small-scale reactor for use in a CCR reformer system (e.g., prior to implementation on a larger scale). For example, such methods may comprise providing an agglomerated reforming catalyst, subjecting the agglomerated reforming catalyst to one or more oxychlorination conditions to provide a re-dispersed reforming catalyst, wherein the subjecting step is configured to simulate a halogenation zone in a continuous catalyst regeneration reformer system, and controlling the one or more oxychlorination conditions to evaluate platinum dispersion on the re-dispersed reforming catalyst. The oxychlorination conditions may be selected from the group consisting of a time, a temperature, a catalyst chloride level, and an oxygen level, for example. In some embodiments, the method additionally may include measuring the platinum dispersion on the re-dispersed reforming catalyst.

In some embodiments, the step of subjecting the agglomerated reforming catalyst may be at least partially conducted in a small-scale reactor to simulate a halogenation zone in a continuous catalyst regeneration reformer system. For example, in some embodiments, the agglomerated reforming catalyst may be subjected to each of the oxychlorination conditions in the small-scale reactor. In such embodiments, one or more, or all, of the oxychlorination conditions may be controlled in the small-scale reactor. In other embodiments, the agglomerated reforming catalyst may be treated with a chloride source as a part of the subjecting step, and subsequently the agglomerated reforming catalyst may be loaded into the small-scale reactor. In such embodiments, the agglomerated reforming catalyst may be loaded into the small-scale reactor and then subjected to the remaining oxychlorination conditions while in the small scale reactor.

In some embodiments, such methods may further comprise subjecting a reforming catalyst to a steam deactivation process to provide the agglomerated reforming catalyst in the first method step. In some embodiments, such methods further may comprise adjusting the one or more oxychlorination conditions to provide a re-dispersed reforming catalyst with higher platinum dispersion. In some embodiments, the one or more oxychlorination conditions may be adjusted to provide a re-dispersed reforming catalyst with one or both of a higher activity and a higher selectivity. In some embodiments, the one or more oxychlorination conditions may be adjusted to provide a re-dispersed reforming catalyst capable of producing a higher unit yield. In some embodiments, the agglomerated reforming catalyst may be in particulate form and comprises a platinum component and a halogen component on a porous carrier. In some embodiments, the halogen component may be chlorine. In some embodiments, the agglomerated reforming catalyst further may comprise a promoter or a stabilizer.

Some embodiments of the disclosure also provide methods of improving the platinum dispersion on a re-dispersed reforming catalyst by adjusting the catalyst chloride level to a level of about 0.5 to about 1.5 wt. % Cl. In some embodiments, the platinum dispersion on a re-dispersed reforming catalyst may be improved by adjusting the catalyst chloride level to a level of about 1.0 wt. % Cl or higher. In some embodiments, the platinum dispersion on a re-dispersed refining catalyst may be improved by adjusting the temperature in the small-scale reactor to a temperature of about 400° C. to about 600° C. In some embodiments, the platinum dispersion on a re-dispersed reforming catalyst may be improved by adjusting the oxygen content in the small-scale reactor to a value of about 5% to about 30%. In some embodiments, the platinum dispersion on a re-dispersed reforming catalyst may be improved by adjusting the time in the small-scale reactor to a value of about 1 hour to about 4 hours. In further embodiments, the method may include evaluating two or more sets of oxychlorination conditions. The method also may include selecting the set of oxychlorination conditions associated with the highest catalyst platinum dispersion for use on a CCR reformer system and, optionally, implementing such set of oxychlorination conditions within the CCR reformer system.

Other aspects of the disclosure may provide a method of selecting a re-dispersed reforming catalyst for use in a CCR reformer system. For example, such selecting may comprise performing one or more of the methods disclosed herein on two or more different agglomerated reforming catalysts and selecting the re-dispersed reforming catalyst demonstrating the highest platinum dispersion for use within a CCR reformer system. The method may, in some embodiments, further comprise implementing the selected re-dispersed reforming catalyst in a CCR reformer system for reforming.

In some embodiments, at least one of the agglomerated reforming catalysts evaluated may comprise a promoter and/or a stabilizer.

In yet other embodiments, methods of operating a CCR reformer system for reforming are disclosed, wherein a regeneration section includes a burn zone, a halogenation zone, and a drying zone in serial progression. In some embodiments, the method may include transfer of catalyst particles, containing a platinum group metal and having coke deposited thereon, to the burn zone and contacting the catalyst particles with an oxygen-containing regeneration gas to combust coke from the particles, passing catalyst particles from the burn zone to halogenation zone, contacting the catalyst particles with a halogen-containing gas in the halogenation zone, re-dispersing the platinum group metal on the catalyst particles, continuously circulating the halogen-containing gas from halogenation gas outlet to a halogenation gas inlet in the halogenation zone, maintaining a halogen concentration on the surface of the catalyst particles of at least about 1.0 weight percent in the halogenation zone, passing catalyst particles from the halogenation zone to a drying zone, and contacting the catalyst particles with a drying gas in the drying zone. In some embodiments, the halogen concentration on the surface of the catalyst particles in the halogenation zone is maintained above 1.2 weight percent. In some embodiments, the halogen concentration on the surface of the catalyst particles in the halogenation zone is maintained in the range of about 1.0 weight percent to about 1.5 weight percent.

The disclosure includes any combination of two, three, four, or more features or elements set forth in this disclosure or recited in any one or more of the claims, regardless of whether such features or elements are expressly combined or otherwise recited in a specific embodiment description or claim herein. This disclosure is intended to be read holistically such that any separable features or elements of the disclosure, in any of its aspects and embodiments, should be viewed as intended to be combinable, unless the context of the disclosure clearly dictates otherwise.

BRIEF DESCRIPTION OF THE DRAWINGS

Having thus described the disclosure in general terms, reference will now be made to the accompanying drawings, which are not necessarily drawn to scale, and wherein:

DETAILED DESCRIPTION OF THE DISCLOSURE

The disclosure now will be described more fully hereinafter with reference to specific embodiments and particularly to the various drawings provided herewith. Indeed, the disclosure may be embodied in many different forms and should not be construed as limited to the embodiments set forth herein; rather, these embodiments are provided so that this disclosure will satisfy applicable legal requirements. As used in the specification, and in the appended claims, the singular forms "a," "an," "the," include plural referents unless the context clearly dictates otherwise.

The disclosure generally provides methods for re-dispersing platinum atoms on reforming catalysts used in a CCR reformer system as will be understood by one skilled in the art. In particular, and provided in further detail herein below, the disclosure includes embodiments of methods of evaluating platinum re-dispersion of reforming catalysts that have been re-dispersed in a small-scale reactor by controlling key oxychlorination conditions or parameters (e.g., the catalyst chloride level, temperature, time, and oxygen level) to simulate a halogenation zone, e.g., such as would be understood by those skilled in the art to be used in commercial CCR reforming processes/within a large-scale CCR reformer system. It should be noted that such methods of evaluating the reforming catalyst do not require the typical reaction section and regeneration section (e.g., as would be present in a commercial CCR unit). Instead, an already agglomerated reforming catalyst (e.g., that has been used in a commercial CCR unit previously) or a reforming catalyst that has been steam deactivated to create platinum agglomeration (e.g., to simulate the aging effects of using the catalyst in a commercial CCR unit) is subjected to one or more oxychlorination conditions at least partially in a small-scale reactor to simulate the halogenation zone. Generally, a "small-scale reactor" as described herein, refers to any reactor vessel that is small enough to be used in a laboratory setting and which allows for control and/or adjustment of the one or more oxychlorination conditions therein. In some embodiments, the small-scale reactor may contain about 1 to about 1,000 grams of reforming catalyst, or about 2.5 to about 500 grams of reforming catalyst, or about 5 to about 100 grams of reforming catalyst. In some embodiments, a micro-reactor may be used. For example, certain micro-reactor technology uses devices with dimensions in the sub-millimeter range to perform chemical transformations. These micro-reactor systems may, in some embodiments, be designed to take advantage of micro-flow phenomena, which enhances mass and heat transfer properties due to the high area-to-volume ratios.

Advantageously, such methods may provide comparative re-dispersion data of different reforming catalysts under controlled conditions (e.g., allowing the user to determine the best catalyst of those tested for implementation in the large scale CCR reformer system), and the conditions may be adjusted so as to predict improvement in the selectivity, activity, and stability of an individual catalyst on a larger scale (such that these conditions may subsequently be implemented on the large-scale CCR reformer system when using such catalyst). As noted above, such small-scale evaluation and control of these oxychlorination conditions, and their effect on the platinum re-dispersion of various catalysts and CCR reforming systems, has not been previously achieved in the industry.

In addition, the methods provided herein can be used to identify or rule out problems with the commercial CCR reformer systems. For example, commercial reforming catalysts that are currently in use may be evaluated using the methods provided herein to troubleshoot issues with inefficient reforming systems. In such embodiments, a catalyst sample exhibiting poor performance on a commercial CCR unit can be subjected to the small-scale re-dispersion processes described herein to determine the cause of the poor performance. For example, if the platinum dispersion is restored on the commercial catalyst in the small-scale re-dispersion processes described herein, this indicates that the commercial regeneration conditions being used in the commercial CCR unit are inefficient and can be adjusted accordingly, or if the platinum dispersion is not restored on the commercial catalyst in the small-scale re-dispersion process, this may indicate that the catalyst has been poisoned and is no longer suitable for use in CCR reformer systems.

Catalysts used for reforming reactions ("reforming catalysts" and/or "catalyst systems" and/or "catalysts" as referred to herein) are comprised of one or more metals and a halogen supported on a porous carrier. Generally, the "one or more metals" may be a Group VIII noble metal, e.g., such as platinum, iridium, rhodium, palladium, and the like. The particular metal or combinations of metals present in the reforming catalyst may vary; however, typically the reforming catalyst contains at least some amount of platinum. A "halogen" as used herein, refers to a Group XVII halogen or halogen-containing component, e.g., such as fluorine, chlorine, bromine, iodine, and astatine. The particular halogen used may vary; however, typically the halogen is a chloride containing compound. A "porous carrier" as used herein, refers to a refractory metal inorganic oxide, e.g., such as alumina, silica, silica-alumina, and the like. The particular refractory metal inorganic oxide forming the porous carrier may vary; however, typically the porous carrier is an alumina support.

In some embodiments, the catalysts used herein may be referred to as a "multi-metallic catalyst system", e.g., such as bi-metallic catalyst systems, tri-metallic catalyst systems, and the like. Generally, "multi-metallic catalyst systems" as used herein, refer to reforming catalysts that comprise a porous carrier having two or more metallic components supported thereon. In some embodiments, a reforming catalyst further may have a promoter and/or a stabilizer supported thereon. For example, a "promoter" may refer to a substance added to a reforming catalyst to improve its performance in a chemical reaction. By itself, the substance may have little or no catalytic effect. Such promoters may comprise one or more metallic ions that are supported on the catalyst system. In some embodiments, adding a promoter metal to the reforming catalyst, for example, may result in better yield, but such advantages may be offset by making it more difficult to maintain high platinum (Pt) dispersion in the reforming catalyst.

Catalyst vendors in the industry continually work to improve the efficiency and other characteristics of reforming catalysts. Such improvements may be achieved by creating new catalyst systems or adding different promoters or stabilizers to already known catalysts. Catalysts and catalyst systems may be referred to herein as "old generation" or "new generation catalysts"; each referring to how recently the catalyst was discovered/developed. For example, old generation catalysts typically refer to catalysts that have been commercially available and used in commercial CCR units historically for many years as would be understood by those skilled in the art, whereas new generation catalysts typically refer to catalysts that are relatively new developments that may or may not have been used in commercial CCR units previously. The effectiveness of a particular catalyst, however, does not necessarily correlate to the particular generation of that catalyst. For example, in some embodiments, newer generation catalysts may not be as effective as older generation catalysts, and in other embodiments, the newer generation catalysts may perform better. Generally, the performance of the catalyst or catalyst system can be evaluated by a number of factors, e.g., such as the platinum dispersion on the surface of the reforming catalyst, the selectivity of the reforming catalyst, the activity of the reforming catalyst, and the like. Thus, a reforming catalyst exhibiting better performance may have a higher platinum dispersion thereon and/or higher selectivity and/or higher activity than a comparable catalyst, whereas a catalyst exhibiting lesser performance may have a lower platinum dispersion thereon and/or lower selectivity and/or lower activity.

Generally, the catalyst is provided in particulate form, and such particles may vary in size and/or shape. Since CCR units circulate catalyst from the reaction section to the regeneration section, they may be cylindrical or spheroidal in shape with diameters from about $1/16^{th}$ to about $1/8^{th}$ inch (1.5-3.1 mm) in size. One or more of the methods and systems described herein may also applicable for evaluating fixed bed reforming catalysts. Fixed bed reforming catalysts may be in the form of an extrudated material having a diameter of from about $1/16^{th}$ to about $1/8^{th}$ inch (1.5-3.1 mm), though they may be as large as ¼ inch (6.35 mm) in diameter. It should be noted that any type of reforming catalyst generally suitable for use in commercial CCR processes generally is meant to be suitable for use in the methods described more specifically herein.

Figure 1:
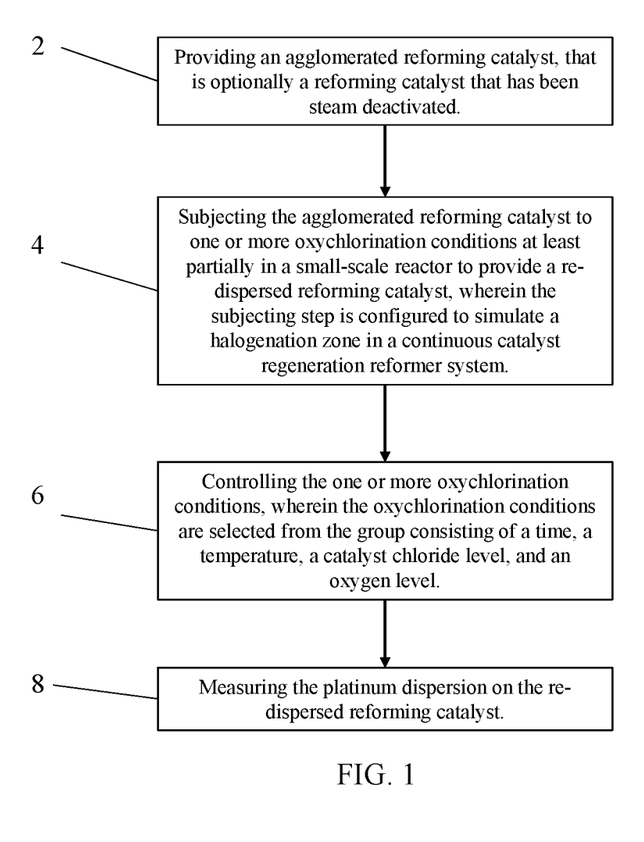
FIG. 1 illustrates a method of evaluating the platinum re-dispersion of a reforming catalyst in a small-scale reactor for use in a CCR reformer system for reforming, according to an embodiment of the disclosure.

As depicted in FIG. 1, one embodiment of the disclosure provides a method of evaluating the platinum re-dispersion on a reforming catalyst in a small-scale reactor for use in a CCR reformer system (e.g., a large scale system). Such methods may comprise, for example, the steps of: (i) providing an agglomerated reforming catalyst (e.g., as shown at operation 2); (ii) subjecting the agglomerated reforming catalyst to one or more oxychlorination conditions at least partially in a small-scale reactor to provide a re-dispersed reforming catalyst, wherein the subjecting step is configured to simulate a halogenation zone in a continuous catalyst regeneration reformer system (e.g., as shown at operation 4); and (iii) controlling the one or more oxychlorination conditions to evaluate platinum dispersion on the re-dispersed reforming catalyst. The oxychlorination conditions, for example, may be selected from the group consisting of a time, a temperature, a catalyst chloride level, and an oxygen level (e.g., as shown at operation 6). The method also may include measuring the platinum dispersion on the re-dispersed reforming catalyst (e.g., as shown at operation 8).

Applicant advantageously has discovered that repeatable platinum dispersion values may be obtained by controlling key parameters during a simulated re-dispersion process in a small-scale reactor, e.g., by controlling one or more oxychlorination conditions in the small-scale reactor according to embodiments of methods provided herein. Thus, under controlled oxychlorination conditions in a small-scale reactor, the platinum re-dispersion on individual reforming catalysts may be measured, evaluated, adjusted, and/or compared to the platinum re-dispersion exhibited on other reforming catalysts. Generally, it is desirable to understand how platinum dispersion will be maintained throughout the life of the reforming catalyst during use in a commercial CCR unit. Using the methods described herein, it should be noted that the platinum re-dispersion of various reforming catalyst samples can advantageously be evaluated before being loaded into a commercial CCR unit.

The terms "platinum re-dispersion" and "platinum dispersion" may be used interchangeably herein, and generally refer to the dispersion and/or distribution of platinum atoms on the surface of the reforming catalyst after the reforming catalyst has been subjected to the one or more oxychlorination conditions to re-disperse the platinum thereon. The dispersion of platinum atoms on the surface of the reforming catalyst is measured as a percentage, wherein the "platinum dispersion percentage" is equal to the number of active platinum sites (e.g., availability to catalytic reactions and/or providing at least some catalytic reactivity) divided by the total amount of platinum present on the reforming catalyst.

Generally, it should be noted that lower platinum dispersion percentages indicate uneven distribution and/or some degree of agglomeration of platinum atoms on the surface of the reforming catalyst, whereas higher platinum dispersion percentages indicate more even distribution and/or minimal to no agglomeration of platinum atoms on the surface of the reforming catalyst. For example, a 100% platinum dispersion value can indicate that the platinum atoms are substantially evenly distributed on the surface of the reforming catalyst, such that all platinum atoms provide active reaction sites. In some embodiments, the platinum re-dispersion on the catalyst may be measured using chemisorption techniques to compare platinum dispersion values before and after the lab re-dispersion process. Other techniques, such as scanning electron microscopy (SEM) and/or x-ray diffraction analyses can be used to monitor platinum dispersion and clustering, for example. Generally, re-dispersed catalyst samples are removed from the small-scale reactor prior to measurement of the platinum dispersion.

In addition, the effect of a promoter or a stabilizer added to a catalyst system may be evaluated to determine the effect of the added promoter or stabilizer on the overall re-dispersion on the reforming catalyst when subjected to oxychlorination conditions. Advantageously, such methods also allow for efficient testing of the platinum re-dispersion of multiple, different reforming catalysts on a small-scale prior to using such catalysts on large-scale, e.g., such as commercially available CCR reforming processes. It should be noted that catalysts showing a low platinum re-dispersion when evaluated according to the methods provided herein may struggle to maintain high platinum dispersion values in a commercial CCR unit, which may translate into lower reforming activity of the overall CCR unit. Meanwhile, catalysts showing high platinum re-dispersion when evaluated according to the methods provided herein advantageously may maintain high platinum dispersion values in a commercial CCR unit, which may translate into higher reforming activity, higher catalyst selectivity, and improved yield.

As noted above, the methods and systems described herein require providing an agglomerated reforming catalyst, e.g., as noted at operation 2. Generally, a deactivation process is used to provide an agglomerated reforming catalyst. During the deactivation process, chlorides are stripped from the catalyst and the platinum atoms (or other metals) contained thereon are agglomerated. In some embodiments, for example, steam deactivation processes are used to artificially age the catalyst samples to provide an agglomerated catalyst sample. The steam deactivation process reduces the catalyst surface and mimics the aging that occurs in a commercial CCR unit. The particular processes used for deactivating the catalyst samples to simulate aging (and agglomerate the platinum atoms) and/or the conditions used during such processes may generally vary. For example, the agglomerated catalyst samples may be obtained directly from a commercial CCR unit (e.g., such that artificial aging of the catalyst is not necessary), or a lab agglomerated catalyst (e.g., that has been steam deactivated to simulate aging of the catalyst) may be used. When preparing a lab agglomerated catalyst, it should be noted that, by controlling the steam deactivation process conditions (e.g., such as temperature, time, and percent steam), the aging process can mimic 1-10 years of operation in a commercial CCR unit. For example, a lab agglomerated catalyst sample can be generated by treating the reforming catalyst with steam using temperatures between about 1000° F. and about 1300° F. In some embodiments, the reforming catalyst may be treated with steam using a temperature of at least about 1000° F., at least about 1050° F., at least about 1100° F., at least about 1150° F., at least about 1200° F., at least about 1250° F., at least about 1300° F., or higher.

After providing the agglomerated reforming catalyst, it is subjected to one or more oxychlorination conditions at least partially in a small-scale reactor to simulate the halogenation zone in a commercial CCR unit. As noted above, for example, the methods and systems described herein allow for control of one or more oxychlorination conditions, optionally in the small-scale reactor, to determine the effect of those particular conditions on the platinum dispersion on a re-dispersed reforming catalyst. In particular, the catalyst chloride level in the reactor, the temperature in the reactor, the oxygen level in the reactor, and the time of the reaction may be controlled to determine the difference in platinum dispersion between multiple reforming catalysts at various conditions (e.g., which reforming catalyst performs best using set conditions) and may be controlled to determine which combinations of conditions provide the desired re-dispersion for a particular reforming catalyst (e.g., which conditions provide the best platinum dispersion for a particular catalyst).

In some embodiments, the platinum re-dispersion on a reforming catalyst may be improved by controlling the halide (e.g., chloride) level on the catalyst surface before and/or during its residence within the small-scale reactor during the re-dispersion process. "Catalyst chloride level" as used herein, refers to the chloride level on the surface of the reforming catalyst and is typically measured when the catalyst is removed from the small-scale reactor, after being subjected to the one or more oxychlorination conditions during the re-dispersion process. Generally, the amount of chloride ions on the catalysts surface can be controlled to maintain peak activity of the reforming catalyst. Advantageously, the presence of chloride ions in the reforming catalyst may help maintain a high platinum dispersion during processing, for example, because the chloride ions react with the oxidized platinum ions which helps redistribute platinum over the catalyst support. In addition, the chloride ions may interact with the porous carrier (e.g., alumina support) to create the acidity needed for reforming reactions.

It should be noted that reforming catalysts are typically pre-chlorided prior to use in commercial CCR units. However, some of this chloride is lost during the reaction in the reaction section and in the burn zone of the regeneration section, reducing the chloride content below desired levels. Thus, subjecting the reforming catalysts to a chloride-containing gas, for example, in the halogenation zone of a commercial regeneration process, allows the lost chloride to be replenished on the reforming catalyst. Generally, the chloride component in commercial CCR units may be injected or sprayed into the halogenation zone. For example, the chloride component in commercial units may include an organic chloride, e.g., such as perchloroethane. However, in the processes and methods described herein, the agglomerated reforming catalyst is treated with a chloride source (e.g., such as hydrochloric acid ("HCl")) and subsequently the agglomerated reforming catalyst is loaded into the small-scale reactor to impart the desired catalyst chloride level on the reforming catalyst while in the small-scale reactor. Generally, addition of this chloride source prior to loading the agglomerated reforming catalyst into the small-scale reactor can create the effect of re-chloriding the agglomerated reforming catalyst, such as would occur when the catalyst comes into contact with the halogen-containing gas in the halogenation zone of a commercial CCR unit. The amount of HCl treated onto the agglomerated reforming catalyst may vary and typically HCl is treated onto the agglomerated reforming catalyst in an amount sufficient to provide the desired catalyst chloride level in the small-scale reactor. For example, the catalyst chloride level may be adjusted to be in the range of about 0.5 to about 1.5 weight percent Cl, about 0.7 to about 1.3 weight percent Cl, or about 1.0 to about 1.2 weight percent Cl. In some embodiments, the catalyst chloride level may be maintained at above 0.7 weight percent Cl, above 1.0 weight percent Cl, above 1.2 weight percent Cl, or above 1.3 weight percent Cl. In particular embodiments, the catalyst chloride level is about 1.0 weight percent Cl or greater. In some embodiments, the moisture content and/or the temperature within the small-scale reactor may also influence the catalyst chloride level.

In some embodiments, the platinum re-dispersion of the reforming catalyst may be improved by controlling the temperature in the small-scale reactor during the re-dispersion process. For example, the temperature in the small-scale reactor may be adjusted to be in the range of about 400° C. to about 600° C., about 450° C. to about 575° C., or about 500° C. to about 550° C. In some embodiments, the temperature in the small-scale reactor may be adjusted to be above about 450° C., above about 475° C., above about 500° C., above about 525° C., above about 550° C., or higher. In some embodiments, the temperature in the small-scale reactor may be adjusted to be about 400° C. or greater, about 450° C. or greater, about 475° C. or greater, about 500° C. or greater, about 525° C. or greater, or about 550° C. or greater.

In some embodiments, the platinum re-dispersion of the reforming catalyst may be improved by controlling the oxygen content in the small-scale reactor during the re-dispersion process. For example, the oxygen content in the small-scale reactor may be adjusted to be in the range of about 5% to about 50% oxygen, about 10% to about 30%, or about 20% to about 25%. In some embodiments, the oxygen content in the small-scale reactor may be adjusted to be above about 10%, above about 15%, above about 20%, above about 25%, above about 30%, and higher. In some embodiments, the oxygen content in the small-scale reactor may be adjusted to be about 5% or greater, 10% or greater, 15% or greater, 20% or greater, 25% or greater, or 30% or greater.

In some embodiments, the platinum re-dispersion of the reforming catalyst may be improved by controlling the time of the re-dispersion process within the small-scale reactor. For example, the time of the re-dispersion reaction may be adjusted to be in the range of about 0.1 hours to about 5 hours, about 1 hour to about 4 hours, or about 2 hours to about 3 hours. I some embodiments, the time of the re-dispersion reaction may be adjusted to be about 4 hours or less, about 3.5 hours or less, about 3 hours or less, about 2 hours or less, or about 1 hour or less.

As noted herein above, any of the above mentioned oxychlorination conditions may be adjusted, in particular, to provide enhanced platinum dispersion on the re-dispersed reforming catalyst, enhanced activity of the re-dispersed reforming catalyst, and/or enhanced selectivity of the re-dispersed reforming catalyst, and/or an increase in unit yield when using the re-dispersed reforming catalyst in a CCR reformer system for reforming as described herein. Such enhancement is understood to be described in comparison to activity under other tested conditions. In other embodiments, the oxychlorination conditions may be controlled and/or fixed at a desired level in the small-scale reactor so as to evaluate and compare the platinum dispersion on various reforming catalysts when subjected to those particular conditions.

As noted above, some aspects of the disclosure provide methods of operating a CCR reformer system for reforming. In some embodiments, the CCR reformer system may comprise a reaction section, a regeneration section, and a halogen recovery section. In some embodiments, each of these individual sections may comprise one or more zones. For example, in some embodiments, the regeneration section includes a burn zone, a halogenation zone, and a drying zone in serial progression. In other embodiments, the burn zone, the halogenation zone, and the drying zone may be in a stacked arrangement, for example, with the burn zone on top such that the catalyst progresses through each of the individual beds under gravity flow.

Figure 2:
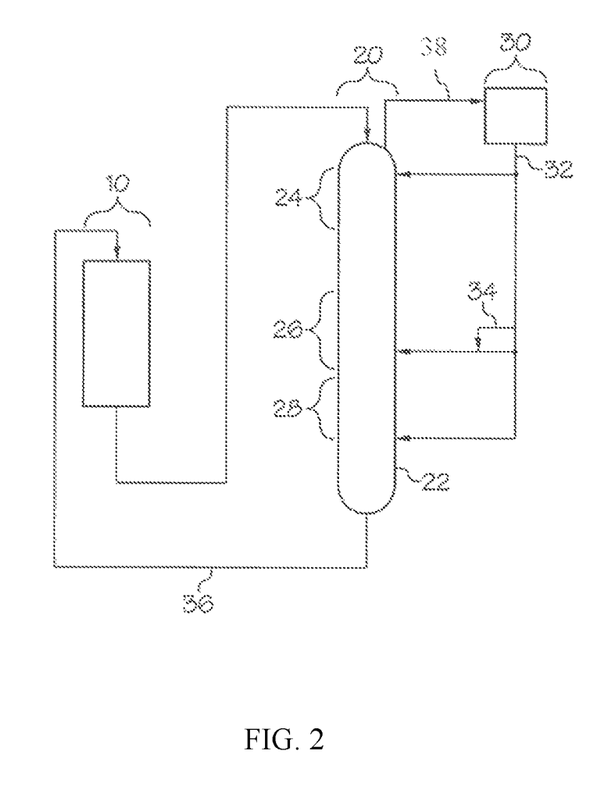
FIG. 2 illustrates a large-scale CCR reformer system for reforming, according to an embodiment of the disclosure.

FIG. 2 illustrates a CCR reformer system for reforming. The process is generally designed for regeneration of a reforming catalyst that is used in a reaction section, e.g., at operation 10. Following the reaction section, the reforming catalyst is passed to a regeneration section 20. Generally, the regeneration section 20 may include one or more regeneration towers 22. The regeneration towers may vary in size and shape and/or in material construction. Typically, any type of regeneration tower typically used in the art may be suitable. As noted above and as depicted in FIG. 2, the regeneration section 20 may include a burn zone 24, halogenation (oxychlorination) zone 26, and drying zone 28. Generally, the catalyst particles, containing a platinum group metal and having coke deposited thereon, are transferred to the burn zone 24 and the catalyst particles are contacted with an oxygen-containing regeneration gas to combust coke from the particles.

Next, the catalyst particles are passed from the burn zone 24 to halogenation zone 26 and the catalyst particles are contacted with a halogen-containing gas in the halogenation zone, re-dispersing the platinum group metal on said reforming catalyst. The halogen-containing gas may vary, however, it typically comprises at least a chloride component. The halogen-containing gas may be added to any of the zones via line 32 to increase the chloride content on the catalyst. While in the halogenation zone 26, the halogen-containing gas from halogenation gas outlet 38 is continuously circulated to a halogenation gas inlet 32 in the halogenation zone 26 via a halogen recovery system 30 and a halogen is added to the halogenation zone 26 in an excess amount to maintain an excess halogen concentration on the surface of the catalyst in the halogenation zone 26. For example, halogen is added to the halogenation zone in an excess amount via line 34, in addition to line 32, to maintain an excess halogen concentration in the halogenation zone 26. In some embodiments, the halogen concentration on the surface of the catalyst in the halogenation zone may be maintained between about 0.5 weight percent to about 1.5 weight percent, about 0.7 weight percent to about 1.3 weight percent, or about 1.0 weight percent to about 1.2 weight percent. In some embodiments, the halogen concentration on the surface of the catalyst in the halogenation zone may be maintained above 0.7 weight percent, above 1.0 weight percent, above 1.2 weight percent, or above 1.3 weight percent. Preferably, the halogen concentration on the surface of the catalyst may be maintained in the range of about 1.0 weight percent to about 1.5 weight percent.

It should be noted that the introduction of the halogen-containing gas in an excess amount advantageously increases the halogen concentration on the surface of the reforming catalyst and thereby, the platinum re-dispersion on the reforming catalyst, which may lead to higher activity and/or selectivity as well as providing a longer lifetime for the CCR catalyst within the system. Generally, the amount of halogen (e.g., chloride) on the catalyst surface and in the gas phase (e.g., the halogen concentration in the halogen-containing gas) can be controlled to maintain peak activity of the reforming catalyst. In some embodiments, the halogen levels on the surface of the reforming catalyst may be controlled by controlling the concentration of halogen in the halogen-containing gas that is continuously circulated within the halogenation zone of the regenerator. In some embodiments, the moisture content and/or the temperature of the halogen-containing gas circulated may also affect the halogen concentration on the surface of the catalyst.

Finally, the catalyst particles may be passed from the halogenation zone 26 to a drying zone 28 and the catalyst particles may be contacted with a drying gas in the drying zone 28. Generally, the drying gas is a heated gas that contacts the catalyst particles and drives moisture from the reforming catalyst. Typically, air or an oxygen-containing gas enters the drying zone as the drying medium and passes upward through the halogenation zone 26 to the burn zone 24 to provide combustion gas. Following the drying zone 28, the catalyst particles are recycled back to reaction section 10 via line 36 and reused in the process.

Having the benefit of the teachings presented in the foregoing descriptions and the examples to follow, many modifications and other embodiments of the disclosure set forth herein will come to mind to those skilled in the art to which these disclosures pertain. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

EXPERIMENTAL

Experiments were conducted with commercial reforming catalysts in a small-scale reactor. The oxychlorination conditions within the small-scale reactor were controlled to evaluate platinum dispersion on the re-dispersed reforming catalysts. The first catalyst evaluated for platinum re-dispersion (referred to herein as "Catalyst A") is an older generation reforming catalyst. Catalyst A is a spherical, platinum/tin containing reforming catalyst promoted on a low density alumina support, which is commercially available from Axens SA®, for example, as the PS-40™ reforming catalyst. Two newer generation reforming catalysts were also evaluated for platinum re-dispersion (referred to herein as "Catalyst B" and "Catalyst C" respectively). Catalyst B is a multi-metallic, platinum/tin containing reforming catalyst promoted on a low density alumina support, which is commercially available from Axens SA®, for example, as the Symphony® PS-100 reforming catalyst. Catalyst C is a spherical, multi-metallic, platinum/tin containing reforming catalyst promoted on a high purity alumina support, which is commercially available from Axens SA®, for example, as the Symphony® PS-110. It should be noted that the particular catalyst samples tested, and the subsequent data and analysis provided herein, is merely presented by way of example and generally any CCR reforming catalyst suitable for use in a CCR reformer system may be evaluated according to the methods and systems described herein.

Initially, each of the catalysts were subjected to a steam deactivation process, resulting in agglomeration of the platinum contained on the catalysts. Each agglomerated catalyst sample was then treated with a chloride source (HCl) and subjected to a re-dispersion process conducted under controlled oxychlorination conditions in a small-scale reactor. Various oxychlorination conditions were controlled and evaluated during the re-dispersion process to determine their effect on the platinum dispersion on the re-dispersed catalysts. The following parameters were found to affect the platinum re-dispersion of the reforming catalysts tested: catalyst chloride level, temperature, oxygen level, and time. Data regarding the effect of these parameters on the platinum re-dispersion of the tested catalysts is provided in the examples herein below. All platinum dispersion values presented therein are in reference to the platinum dispersion percentage, for example, as defined herein above.

Example 1

Re-dispersion experiments were conducted on Catalyst A and Catalyst B in a small-scale reactor at 550° C. with 21% oxygen for 4 hours. Catalyst chloride levels were varied between 0.7 and 1.2 wt. % Cl to determine the effect of catalyst chloride level on platinum dispersion in the tested catalysts. As demonstrated in Table 1 below, platinum dispersion improved when catalyst chloride levels were increased to 1.0 wt. % Cl and further improved significantly when catalyst chloride levels were increased to 1.2 wt. % Cl. Similar improvements were observed for both Catalyst A and Catalyst B. However, Catalyst A displayed higher platinum dispersion after treatment than Catalyst B.

TABLE 1

|  | A | B |
| --- | --- | --- |
| 0.7 wt. % Cl |  | 20% |
| 1.0 wt. % Cl | 59% | 32% |
| 1.2 wt. % Cl | 98% | 79% |

Example 2

Re-dispersion experiments were conducted on Catalysts A, B and C in a small-scale reactor for 4 hours with 21% oxygen with a catalyst chloride level of 1.2 wt. % Cl. Temperature was varied between 468° C. to 550° C. within the reactor to determine the effect of temperature on platinum dispersion in the tested catalysts. As demonstrated in Table 2, all catalyst systems generally displayed improved platinum dispersion values when higher temperatures were used. In fact, Catalyst A experienced 100% platinum dispersion when subjected to a temperature of 550° C.

TABLE 2

|  | A | B | C |
| --- | --- | --- | --- |
| 468° C. (875° F.) | 73% | 64% | 45% |
| 510° C. (950° F.) | 83% | 81% | 69% |
| 550° C. (1022° F.) | 100% | 79% | 82% |

Example 3

Re-dispersion experiments were conducted on Catalyst A in a small-scale reactor at 550° C. for 4 hours with a catalyst chloride level of 1.2 wt. % Cl. The oxygen level was varied to between 7% and 21% within the reactor to determine the effect of oxygen level on platinum dispersion in the tested catalysts. As demonstrated in Table 3, platinum dispersion remained low until the oxygen content was increased to 21% oxygen; for example, the platinum dispersion increased from 25% to 98% when the oxygen level was increased from 18% to 21% oxygen.

TABLE 3

|            | A    |
|------------|------|
| 7% oxygen  | 22%  |
| 18% oxygen | 25%  |
| 21% oxygen | 98%  |

Example 4

Re-dispersion experiments were conducted on Catalysts A, B, and C in a small scale reactor at 550° C. with an oxygen content of 21% and a catalyst chloride level of 1.2 wt. % Cl. To evaluate how time affects platinum re-dispersion, the re-dispersion procedure was conducted using regeneration times between 1 and 4 hours. In a commercial CCR unit, it takes approximately 4 hours for the reforming catalyst to pass through the regenerator. Therefore, it is desirable to complete the dispersion in less than 4 hours. As demonstrated in Table 4, all three catalysts tested displayed reasonable platinum dispersion values after a re-dispersion time of 1 hour (e.g., all having platinum dispersion of at least 67%). In addition, platinum dispersion values displayed a further increase as the time was extended to 2 hours and 4 hours in both Catalyst A and C. Catalyst B showed a decrease in platinum dispersion from 1 hour to 2 hours (likely due to error). Generally, as demonstrated in Table 4, Catalyst A achieved 98% platinum dispersion, while Catalyst B and Catalyst C showed slightly lower platinum dispersion values (79% for Catalyst B and 82% for Catalyst C) after four hours.

TABLE 4

|      | A   | B   | C   |
|------|-----|-----|-----|
| 1 hr | 79% | 72% | 67% |
| 2 hr | 86% | 56% | 67% |
| 4 hr | 98% | 79% | 82% |

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims.

The invention claimed is:

1. A method of analyzing platinum re-dispersion for an activated continuous catalyst regeneration (CCR) reformer system, the method comprising:
   simulating a halogenation zone in a small-scale reactor for use by a CCR reformer system, the simulation comprising:
   (a) subjecting an activated catalyst, including platinum, to steam deactivation, thereby to agglomerate the platinum and provide an agglomerated reforming catalyst;
   (b) treating the agglomerated reforming catalyst with a chloride source, and
   (c) subjecting the treated agglomerated reforming catalyst to one or more oxychlorination conditions at least partially in the small-scale reactor, thereby to disperse the platinum agglomerate and provide a re-dispersed reforming catalyst;
   measuring an amount of platinum dispersion on a surface of the re-dispersed reforming catalyst;
   altering at least one of the one or more oxychlorination conditions within the small-scale reactor, the one or more oxychlorination conditions selected from the group consisting of time, temperature, catalyst chloride level and oxygen content, thereby to subject the re-dispersed reforming catalyst to the altering of at least one of the one or more oxychlorination conditions at least partially in the small-scale reactor;
   measuring change in the amount of platinum dispersion due to the altering of at least one of the one or more oxychlorination conditions;
   predicting an amount of platinum re-dispersion for a CCR reformer system responsive to the change in measurements of the amount of platinum dispersion from the small-scale reactor; and
   selecting a catalyst for use in the CCR reformer system responsive to the predicted amount of platinum re-dispersion.

2. The method of claim 1, wherein the measured change in the amount of platinum dispersion due to the altering of at least one of the one or more oxychlorination conditions indicates that the altered oxychlorination conditions increases the dispersion of platinum.

3. The method of claim 1, wherein the simulation further comprises the altering of at least one of the one or more oxychlorination conditions in the small-scale reactor, thereby to provide higher catalyst activity or higher catalyst selectivity.

4. The method of claim 1, wherein the simulation further comprises the altering of at least one of the one or more oxychlorination conditions in the small-scale reactor, thereby to provide higher unit yield.

5. The method of claim 1, wherein the agglomerated reforming catalyst comprises a particulate form and a platinum component supported on a porous carrier.

6. The method of claim 5, wherein the agglomerated reforming catalyst further comprises a chlorine component supported on the porous carrier.

7. The method of claim 5, wherein the agglomerated reforming catalyst further comprises one or more of a promoter or a stabilizer.

8. The method of claim 1, wherein the altering of at least one of the one or more oxychlorination conditions comprises adjusting the catalyst chloride level to a range of about 0.5 to about 1.5 wt. % Cl.

9. The method of claim 1, wherein the chloride source comprises an acid.

10. The method of claim 1, wherein the altering of at least one of the one or more oxychlorination conditions comprises adjusting the temperature in the small-scale reactor to a range of about 400° C. to about 600° C.

11. The method of claim 1, wherein the altering of at least one of the one or more oxychlorination conditions comprises adjusting the oxygen content in the small-scale reactor.

12. The method of claim 1, wherein the altering of at least one of the one or more oxychlorination conditions comprises adjusting an amount of time that the agglomerated reforming catalyst is subjected to the at least one of the one or more oxychlorination conditions in the small-scale reactor to a range of about 1 hour to about 4 hours.

13. The method of claim 1, further comprising selecting at least one of the one or more oxychlorination conditions associated with the highest platinum dispersion for use in the CCR reformer system.

14. A method of selecting a platinum continuous catalyst regeneration (CCR) reformer system, the method comprising;
   (a) performing the simulating steps (a)-(c) of the method of claim 1 on two or more different agglomerated reforming catalysts; and
   (b) further selecting the re-dispersed reforming catalyst exhibiting the highest amount of platinum dispersion to be used in the CCR reformer system.

15. The method of claim 14, further comprising:
   (c) implementing the re-dispersed reforming catalyst exhibiting the highest amount of platinum dispersion in the CCR reformer system.

16. The method of claim 14, wherein at least one of the two or more different agglomerated reforming catalysts comprises one or more of a promoter or a stabilizer.

17. A method of analyzing platinum re-dispersion for an activated continuous catalyst regeneration (CCR) reformer system, the method comprising:
   providing an agglomerated reforming catalyst, the agglomerated reforming catalyst comprising platinum agglomerate;
   treating the agglomerated reforming catalyst with a chloride source;
   subjecting the treated agglomerated reforming catalyst to one or more oxychlorination conditions at least partially in a small-scale reactor, thereby to disperse the platinum agglomerate and provide a re-dispersed reforming catalyst, the small-scale reactor configured to simulate a halogenation zone in a CCR reformer system;
   measuring an amount of platinum dispersion on a surface of the re-dispersed reforming catalyst;
   adjusting at least one of the one or more oxychlorination conditions within the small-scale reactor, the one or more oxychlorination conditions selected from the group consisting of time at a range of about 1 to about 4 hours, temperature at a range of about 400° C. to about 600° C., catalyst chloride level at a range of about 0.5 to about 1.5 wt. % Cl, and;
   subjecting the re-dispersed reforming catalyst to the adjusted at least one of the one or more oxychlorination conditions at least partially in the small-scale reactor; and
   measuring change in the amount of platinum dispersion due to the subjecting of the re-dispersed reforming catalyst to the adjusted at least one of the one or more oxychlorination conditions.

18. The method of claim 17, wherein the adjusting of at least one of the one or more oxychlorination conditions comprises adjusting at least the oxygen content and the catalyst chloride level.

19. The method of claim 17, wherein the adjusting of at least one of the one or more oxychlorination conditions results in a platinum dispersion of up to 100%.

20. The method of claim 1, wherein the adjusting of at least one of the one or more oxychlorination conditions results in an amount of platinum dispersion of up to 100%.

* * * * *